United States Patent
Vennelakanti et al.

(10) Patent No.: US 8,063,738 B2
(45) Date of Patent: Nov. 22, 2011

(54) RFID SYSTEM WITH A MOBILE RFID READER

(75) Inventors: Ravigopal Vennelakanti, Palo Alto, CA (US); Manish Gupta, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 741 days.

(21) Appl. No.: 12/208,344

(22) Filed: Sep. 11, 2008

(65) Prior Publication Data
US 2009/0195358 A1 Aug. 6, 2009

(30) Foreign Application Priority Data
Feb. 4, 2008 (IN) .............................. 298/CHE/2008

(51) Int. Cl.
| | |
|---|---|
| G05B 19/00 | (2006.01) |
| G05B 23/00 | (2006.01) |
| G06F 7/00 | (2006.01) |
| G08B 29/00 | (2006.01) |
| G08C 19/00 | (2006.01) |
| G06Q 10/00 | (2006.01) |
| H04B 1/00 | (2006.01) |
| H04Q 1/00 | (2006.01) |

(52) U.S. Cl. .................... 340/5.92; 340/572.1; 340/10.2; 235/385; 705/28
(58) Field of Classification Search ................. 340/5.92, 340/572.1, 10.2; 235/385; 705/28
See application file for complete search history.

(56) References Cited

U.S. PATENT DOCUMENTS
| | | | | |
|---|---|---|---|---|
| 7,132,945 | B2 * | 11/2006 | Dunlap, Jr. ................. | 340/572.1 |
| 7,417,544 | B2 * | 8/2008 | Artem et al. ............... | 340/572.1 |
| 2002/0175805 | A9 * | 11/2002 | Armstrong et al. ........ | 340/10.31 |
| 2005/0012613 | A1 | 1/2005 | Eckstein et al. | |
| 2005/0246248 | A1 * | 11/2005 | Vesuna ........................ | 705/28 |
| 2006/0255948 | A1 | 11/2006 | Runyon et al. | |
| 2007/0001808 | A1 * | 1/2007 | Kastelic et al. ............. | 340/10.1 |
| 2007/0136152 | A1 | 6/2007 | Dunsker et al. | |
| 2007/0149184 | A1 | 6/2007 | Viegers et al. | |
| 2007/0152047 | A1 | 7/2007 | Tu et al. | |
| 2008/0024301 | A1 * | 1/2008 | Fritchie et al. ............. | 340/572.1 |

FOREIGN PATENT DOCUMENTS
WO    WO 2007/036940 A2 *  4/2007

* cited by examiner

*Primary Examiner* — Jennifer Mehmood
*Assistant Examiner* — Andrew Bee

(57) ABSTRACT

An RFID system includes a pair of guide tracks located on opposite boundaries of at least one zone. A channel is movably attached to the guide tracks and is configured to move along the guide tracks through the at least one zone. A mobile RFID reader is movably attached to the channel and the mobile RFID reader is paused at a plurality of read points to scan for RFID tags located. The read points are determined by an arrangement of a plurality of hexagonal areas which are grouped together to create a combined area, where the combined area is aligned with the predefined area to define locations of the plurality of hexagonal areas, and where substantially central locations of each hexagonal area represent the plurality of read points.

20 Claims, 14 Drawing Sheets

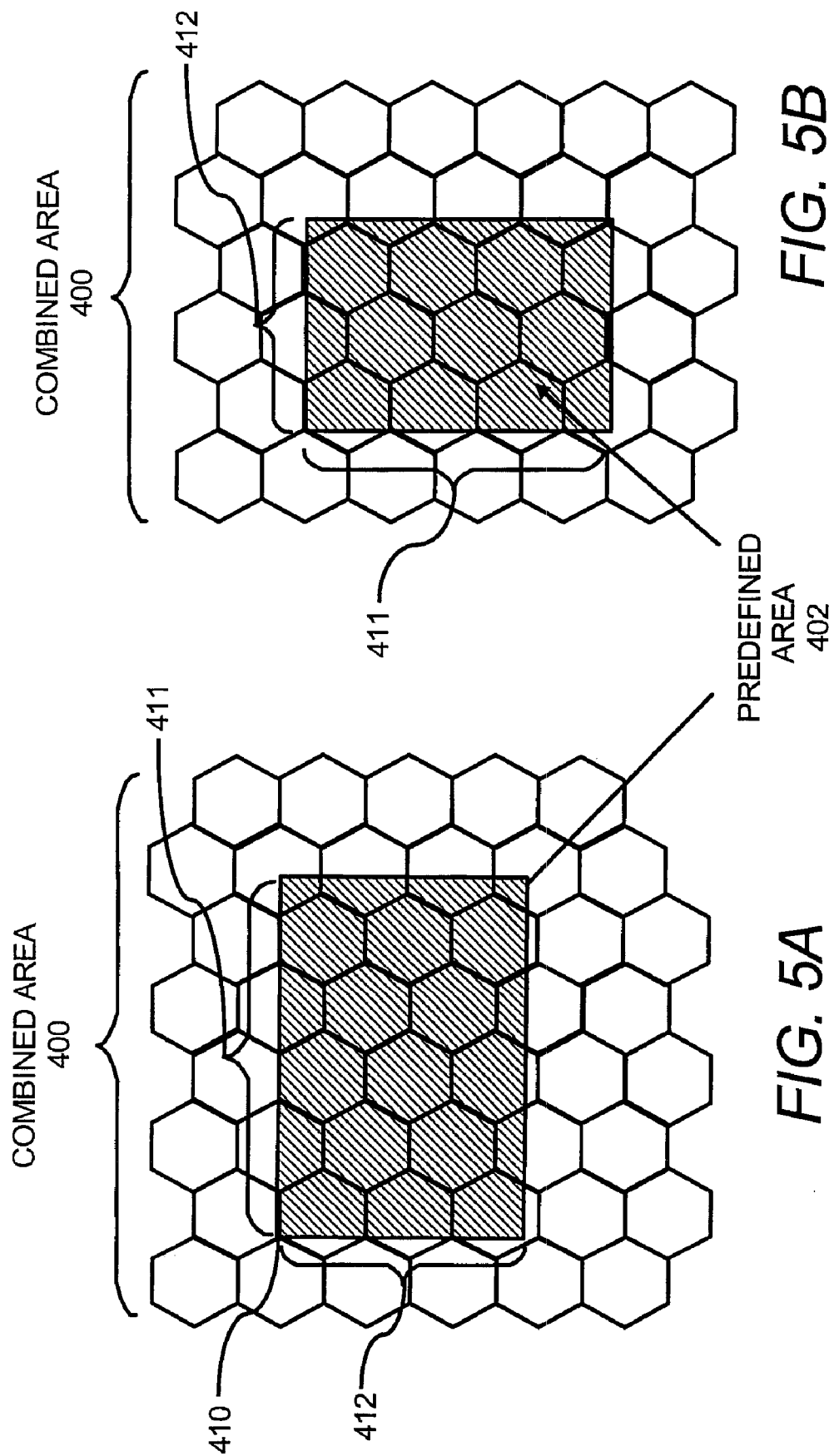

RFID SYSTEM WITH A MOBILE RFID READER

BACKGROUND

Radio Frequency Identification (RFID) technology uses radio frequency (RF) waves to exchange information for a variety of purposes, including identification. An RFID system typically includes an RFID reader or transceiver having an antenna and an RFID tag or transponder containing information. Active RFID systems utilize a dedicated power source to power RFID tags. In contrast, passive RFID systems do not rely on an internal power source to power RFID tags. Instead, the antenna of the RFID reader emits RF signals to activate passive RFID tags within a reading range. When activated, the passive RFID tags are configured to transmit a responding signal to the RFID reader.

RFID technology has been widely used for tracking and monitoring items. For example, RFID systems are used in warehouses to monitor the movement of products and inventory. In many inventory control systems, an RFID tag containing a unique code is attached to items in the warehouse. This allows each item in the warehouse to be identified by the unique code of the attached RFID tag. One or more RFID readers are installed at predefined locations in the warehouse to read the RFID tags attached to the items. By keeping track of all the unique codes read by the RFID readers, an accurate record of inventory levels and movement is maintained. Accordingly, the use of RFID technology in inventory control systems also reduces the possibility of human error, which may arise in manual tracking processes.

In large-scale deployment of RFID technology for inventory control systems, the positioning of the RFID readers in the warehouse is crucial. Current positioning techniques of the RFID readers in warehouses typically result in blind-spots in the RFID signal coverage or interferences between the RFID readers. For example, insufficient RFID readers or poor RFID reader placement in the warehouse may result in less than 100% area coverage of the RFID reader signals. Therefore, RFID tags in certain locations of the warehouse will not be read by the RFID readers. Similarly, if the RFID readers are spaced too closely together, interference among the RFID readers reduces the reliability and efficiency of the RFID system.

It would thus be beneficial to have the ability to obtain data from RFID tags positioned throughout a relatively large space without suffering from the disadvantages and drawbacks associated with conventional tracking techniques.

BRIEF DESCRIPTION OF THE DRAWINGS

Features of the present invention will become apparent to those skilled in the art from the following description with reference to the figures, in which:

FIG. 5A shows a first type of alignment of a predefined area and a combined area, according to an embodiment of the invention;

FIG. 5B shows a second type of alignment of a predefined area and a combined area, according to an embodiment of the invention;

DETAILED DESCRIPTION

Figure 1:
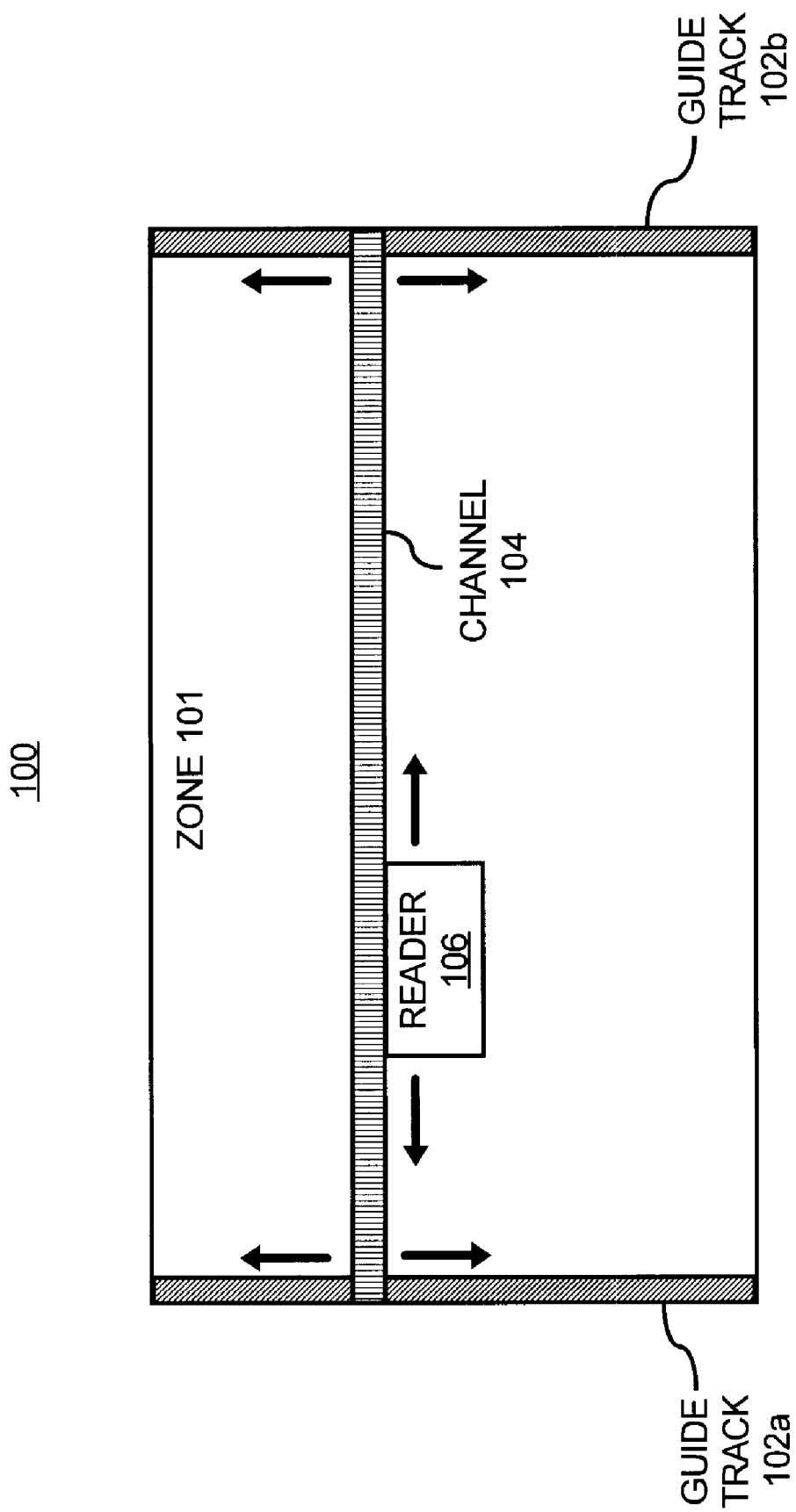
FIG. 1 shows a simplified view of an RFID system, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are systems and methods for moving an RFID reader within a predefined area to allow the RFID reader to scan for RFID tags. The predefined area may be any area where RFID tags are expected to be located. For example, the predefined area may be at least a portion of a warehouse in which items having RFID tags are located.

According to an example, the predefined area is divided into zones. The term "zone," as used herein, refers to a region within the predefined area that a single RFID reader may move through to read RFID tags located within and/or outside of the zone. For instance, the RFID reader may be moved to or near a boundary of the zone, yet may still be operable to read RFID tags located outside of the zone. The zone may be any region within the predefined area or may be the entire predefined area itself. The zone may be a three-dimensional area having boundaries in the X, Y, and Z dimensions, as described in greater detail below. In some embodiments, the predefined area may be divided into multiple zones and one or more RFID readers may be configured to move through the one or more zones, and scan for RFID tags located within the predefined area.

A pair of guide tracks between which one or more RFID readers may travel may be placed on opposite edges of at least one of the zone boundaries. For example, if a zone is a rectangle having a length and a width, the guide tracks may be placed along edges of the width of the rectangle. However, the predefined area may have multiple zones and the guide tracks may be placed on the edge of a first zone and the opposite edge of a second zone. The guide tracks may comprise any mechanical means of securing a channel thereto to allow the channel to move along the guide tracks to traverse the zone. The term "channel," as used herein, refers to a mechanical means of moving an RFID reader along the channel. For example, the guide tracks and the channel may comprise a rail, wheels, magnets, etc., on which the RFID reader is movably attached. Therefore, the RFID reader is operable to move along the channel while the channel is operable to move across the zone along the guide tracks. In this manner, the RFID reader may be moved to any position within the zone to scan for RFID tags.

In an embodiment, the RFID reader may pause at optimized read points within the zone. The term "pause," as used herein, refers to a decrease in the speed of movement of the RFID reader. As the RFID reader moves along the channel and/or the channel moves along the guide tracks, the RFID reader may be slowed down or stopped at the read points to allow the RFID reader to scan for RFID tags. The RFID reader may remain substantially motionless at the read points for any reasonably suitable duration of time.

The optimized read points at which the RFID reader may be paused may be determined by tessellating the predefined area. That is, a plurality of hexagonal areas may be arranged together to form a honeycomb grouping or combined area, such that substantially no gaps exist between any two hexagonal areas. The combined hexagonal areas may be equal in size or larger than the predefined area. The combined area of hexagonal areas may be aligned with the predefined area. It should be understood that the predefined area does not have to be physically tessellated by marking or otherwise altering the predefined area itself, but that the predefined area need only be conceptually tessellated. In any regard, each of the hexagonal areas may represent an approximate reading range of an RFID reader. Therefore, the number of hexagonal areas needed to cover the predefined area is dependant upon the reading range of the RFID reader. The larger the reading range, the fewer the number of hexagonal areas need to cover the predefined areas. The process of tessellating the predefined area and determining the read points is discussed in greater detail below.

The methods and systems described herein allow for the efficient reading of RFID tags located at different locations in a predefined area to achieve substantially 100% coverage of the predefined area. The systems and methods may be used in any reasonably suitable RFID applications, including tracking and monitoring RFID-tagged items, such as inventory in a warehouse. In addition, substantially optimized read points to pause and read RFID tags, as opposed to continually moving the RFID reader throughout the predefined area, may be determined, which limits redundant reads of RFID tags. Moreover, determining specific optimized read points also allows coverage of the entire predefined area with the smallest possible number of reader pauses. This significantly improves the efficiency of the reading process as well as the reader utilization.

Moreover, the dynamic positioning and movement of the channel and the attached RFID reader allows for greater adaptation and provides greater flexibility in the choice of readers. That is, many different RFID readers are available, which have different reading ranges. The systems and methods described herein allow RFID readers with different reading ranges to be interchanged, because the RFID readers may be moved to different read points within a zone of the predefined area to account for differences in reading range. For instance, if an RFID reader having a different reading range is used, a new set of read points may be determined by re-tessellating the predefined area based on the new reading range. The RFID reader may then be moved to the newly determined read points to provide substantially 100% coverage of the predefined area. The greater flexibility of movement of the RFID reader also allows for variations in storage conditions and/or RFID tag location densities. For example, if a particular region of a zone contains a source of interference or a greater number of RFID tags, the RFID reader may be paused at that particular region for a longer duration of time to ensure that all the RFID tags are read.

With particular reference now to FIG. 1, there is shown a simplified diagram of an RFID system 100 for moving a reader 106 within a zone 101, according to an embodiment. Although particular reference has been made herein below to the RFID system 100 as including particular features, it should be understood that the RFID system 100 may include additional components and that some of the components described may be removed and/or modified without departing from a scope of the RFID system 100.

The RFID system 100 is illustrated as including guide tracks 102a and 102b, a channel 104 attached to the guide tracks 102a and 102b, and a reader 106 attached to the channel 104. The guide tracks 102a and 102b may be any reasonably suitable mechanical device for allowing the channel 104 to move along the guide tracks 102a and 102b in the directions indicated by the sets of arrows adjacent to each of the guide tracks 102a and 102b. For example, the guide tracks 102a and 102b may comprise rails, wheels, ball bearings, magnets, etc., to which the channel 104 may be movably attached. Moreover, as FIG. 1 shows, the guide tracks 102a and 102b may have a series of graduated markings at predetermined intervals along the length of one or more of the guide tracks 102a or 102b. For example, there may be a marking at every inch or centimeter of one or more of the guide tracks 102a and 102b. The markings may be used in determining the precise position of the channel 104 along the guide tracks 102a and 102b. While the graduated markings on the guide tracks 102a and 102b are shown as being diagonally arranged in FIG. 1, a person having ordinary skill in the art will appreciate that the graduated markings may be horizontal or at any other reasonably suitable angle.

The reader 106 may comprise any reasonably suitable device operable to read RFID tags. Although the reader 106 is shown as a simple block diagram in FIG. 1, a person having ordinary skill in the art will appreciate that the reader 106 may include additional components, such as one or more antennas, an internal power source, memory, equipment to communicate with other electronic devices, etc. The reader 106 is operable to move along the channel 104 in the directions indicated by the arrows adjacent to the reader 106. For example, the channel 104 may comprise a rail, wheels, magnets, ball bearings, etc., to which the reader 106 is movably attached. Like the guide tracks 102a and 102b, the channel 104 also comprises graduated markings to aid in determining the precise position of the reader 106 along the channel 104.

The guide tracks 102a and 102b generally define the zone 101 between the guide tracks 102a and 102b, in which the reader 106 may be moved. That is, the reader 106 may be moved to different positions within the zone 101 to read RFID tags located within the zone 101. In addition, the reader 106 may be operable to read RFID tags located outside of the zone 101. For instance, the reader 106 may be moved to a position near an edge of the zone 101 and the reading range of the reader 106 may extend beyond the edge of the zone 101.

In one embodiment, FIG. 1 may be a birds-eye view of the RFID system 100. That is, the zone 101 may be a predefined area, such as a room or a warehouse, and the guide tracks 102a and 102b may be attached to the ceiling of the predefined area. Therefore, the channel 104 may move along the guide tracks across the ceiling of the predefined area. However, in other embodiments, the guide tracks may be positioned on the floor of the predefined area or mounted in any reasonably suitable location between the floor and ceiling of the predefined area. As such, the zone 101 may represent a three-dimensional area extending above and/or below the guide tracks 102a and 102b, channel 104, and reader 106. In this regard, the reader 106 may be positioned to move vertically with respect to the channel 104 to obtain data from RFID tags positioned at different heights. Also, the zone 101 may represent only a portion of a predefined area and the reader 106 may be operable to read RFID tags located outside of the zone 101 and/or the predefined area may have multiple zones and multiple RFID systems, as will be described in greater detail below.

As mentioned above, it should be understood that the RFID system 100 shown in FIG. 1 is merely an example of how such an RFID system 100 may be configured. For example, it is within the level of ordinary skill in the art to attach the reader 106 to the channel 104 in different configurations. Therefore, in other embodiments, the reader 106 may sit on top of the channel 104 or may be suspended underneath the channel 104. In fact, the reader 106 may be lowered below the channel 104 or raised above the channel 104.

Figure 2:
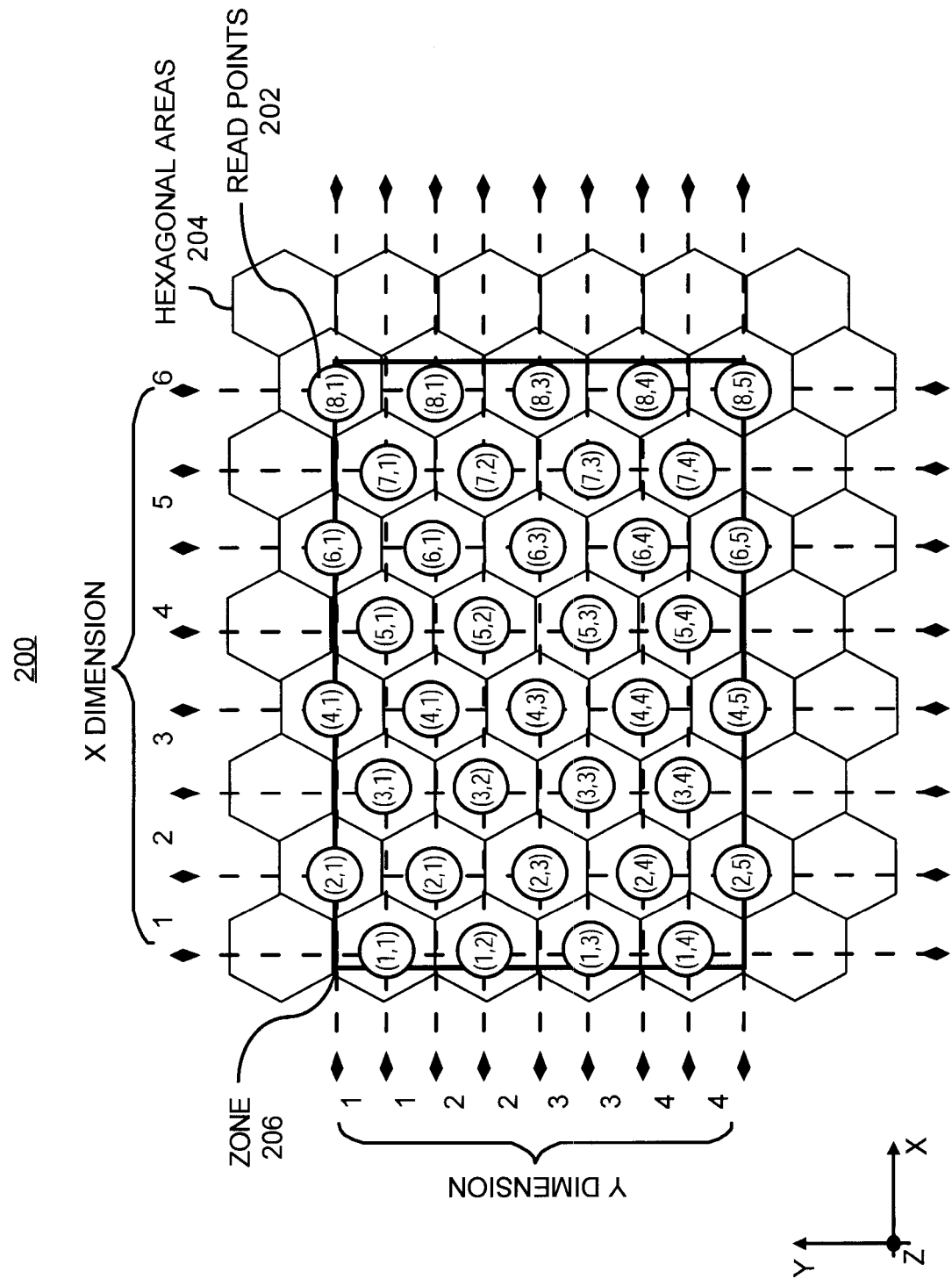
FIG. 2 shows a simplified view of an RFID system and read points, according to another embodiment of the invention.

With particular reference now to FIG. 2, there is shown a simplified diagram of an RFID system 200 with a plurality of read points 202, according to an embodiment. Although particular reference has been made herein below to the RFID system 200 as including particular features, it should be understood that the RFID system 200 may include additional components and that some of the components described may be removed and/or modified without departing from a scope of the RFID system 200.

The RFID system 200 is illustrated as including a plurality of read points 202, which are represented here as a plurality of circles. The read points 202 are optimum positions at which a reader, such as the reader 106, described above with respect to FIG. 1, may pause to scan for RFID tags. By determining optimized read points, a reader may obtain full blanket coverage of a predefined area. For example, the plurality of read points 202 shown in FIG. 2, allow for full coverage of zone 206, as well as limited coverage of regions beyond the zone 206. The read points 202 may be determined by tessellating or dividing the predefined area into a plurality of hexagonal areas 204. For example, the read points 202 may be determined by tessellating the predefined area such that the predefined area fully or partially covers the least number of hexagonal areas 204 in the tessellation pattern. Each of the hexagonal areas 204 may represent a reading range of a single reader 106. Therefore, the centers of each of the hexagonal areas 204 correspond to read points 202 where the reader 106 may pause to scan for RFID tags.

Figure 3:
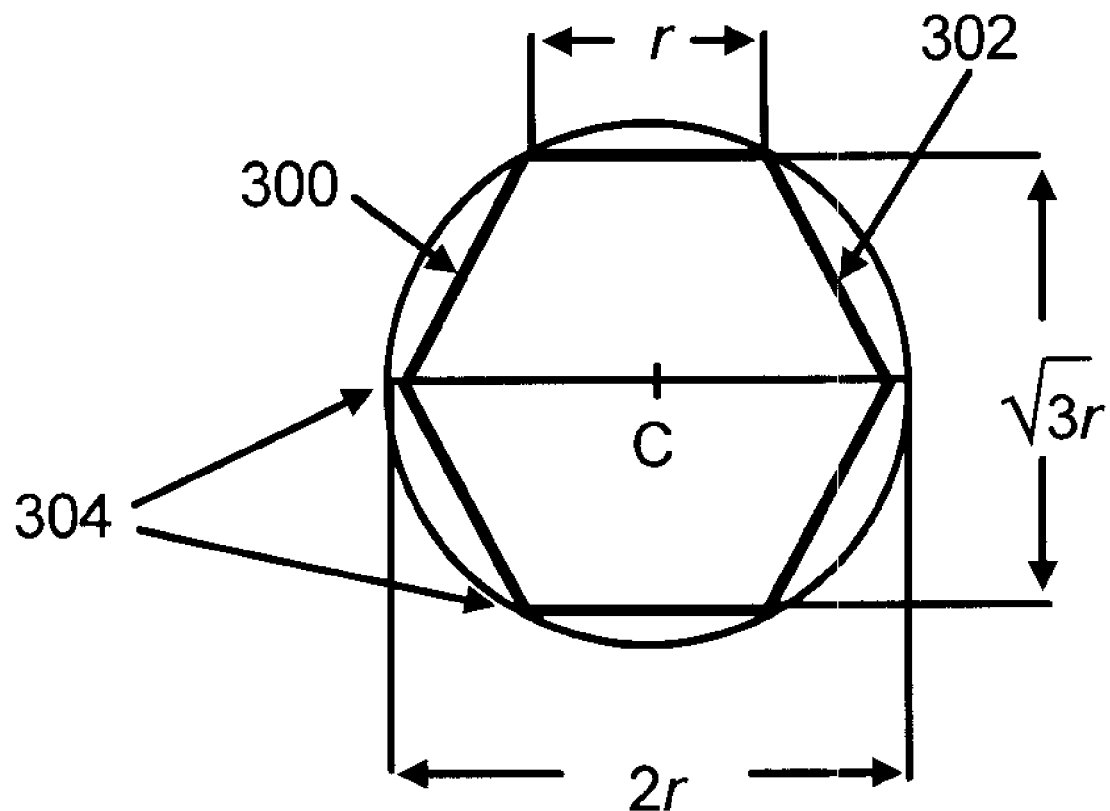
FIG. 3 shows a hexagonal area representing a circular reading range of an RFID reader, according to an embodiment of the invention.

With respect to FIG. 3, there is shown a hexagonal area 300, according to an embodiment. For example, the hexagonal area 300, shown in FIG. 3 may represent one or more of the hexagonal areas 204 depicted in FIG. 2. The center C of the hexagonal area 300 may be a read point for an RFID reader. In this embodiment, the circle surrounding the hexagonal area 300 represents the circular reading range 302 of the RFID reader. The circular reading range 302 has a radius r, with the RFID reader at the center C of the hexagonal area 300. As can be seen from FIG. 3, the length from the center C to any vertex 304 of the hexagonal area 300 is r. Accordingly, the length of any sides of the hexagonal area 300 is also r.

Figure 4:
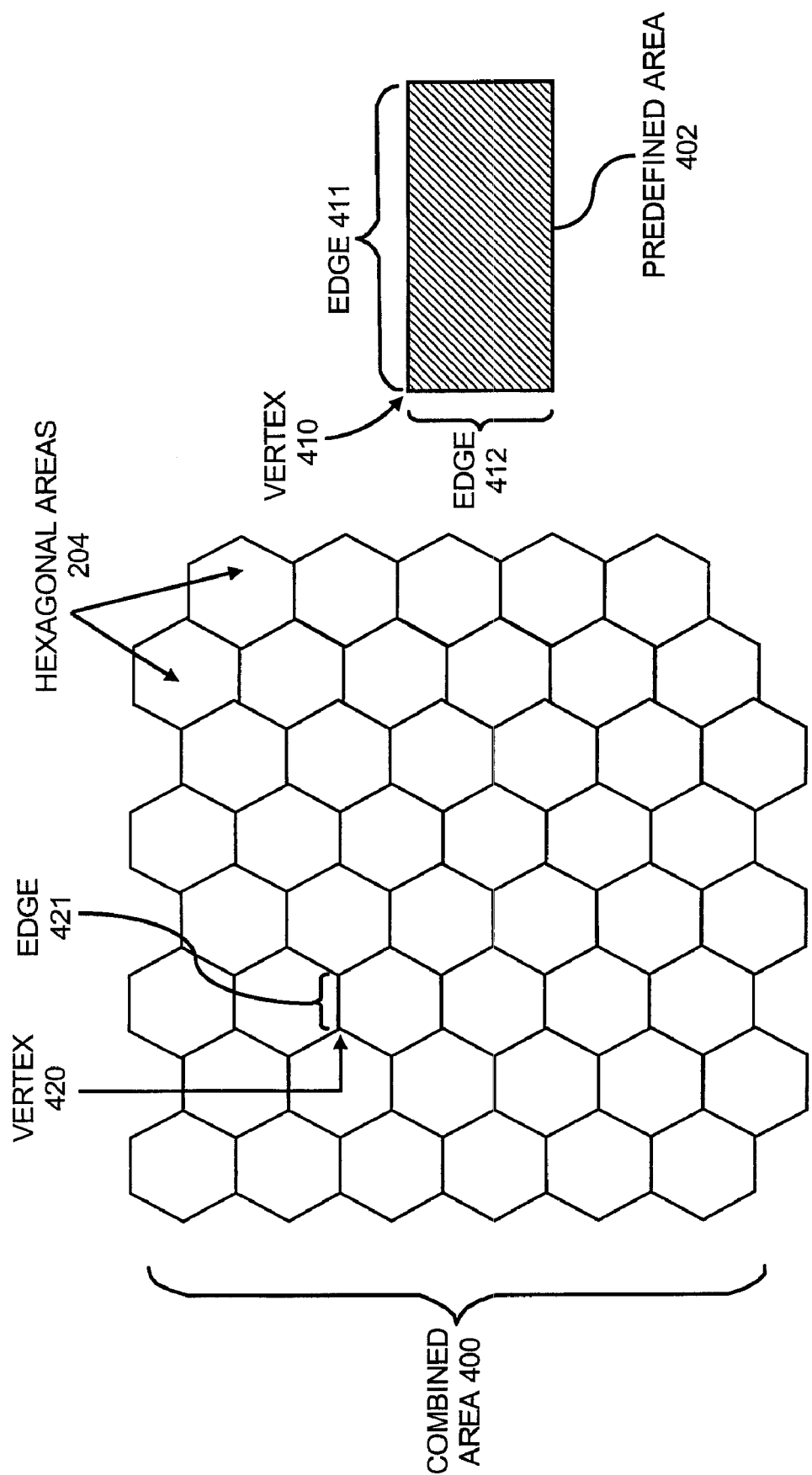
FIG. 4 shows a plurality of hexagonal areas arranged together to form a honeycomb combined area, according to an embodiment of the invention.

With respect to FIG. 4 there is shown a tessellated combined area 400 and a predefined area 402, according to an embodiment. The predefined area 402 may represent the total area of a region where RFID tags are expected to be located. For example, the predefined area 402 may be a warehouse or a portion of a warehouse in which RFID tags are expected to be located. As described above, the hexagonal areas 204 may be arranged together as a honeycomb of hexagonal areas 204 to form the combined area 400. As such, there are no gaps between any two of the hexagonal areas 204 in the combined area 400. The formation of the combined area 400 by arranging the hexagonal areas 204 together should stop only when the combined area 400 is sufficient to cover or is larger than the predefined area 402. The number of hexagonal areas 204 needed to form the combined area 400 which is equal to or larger than the predefined area 402 depends on the reading range r of the RFID reader used in the RFID system. The larger the reading range 302, the fewer the number of hexagonal areas 204 are needed to form the combined area 400.

With respect to FIGS. 5A and 5B, there are shown possible alignments of the predefined area 402 within the combined area 400, according to two different embodiments. In fact, there are many possible ways of aligning the predefined area 402 within the combined area 400. For example, a brute force approach of positioning one of the hexagonal areas 204 at a corner of the predefined area 402 as a reference hexagon may be used. Further possible alignments may be obtained by rotating a reference hexagon by a certain angle.

A method for determining an optimized alignment of the predefined area 402 with the combined area 400 will be described as an embodiment. In this embodiment, the predefined area 402 is a rectangular area. However, a person having ordinary skill in the art will appreciate that in other embodiments the predefined area 402 may be any other reasonably suitable shape. Referring back to FIG. 4, the rectangular predefined area 402 is arranged within the combined area 400 such that a vertex 410 of the predefined area 402 coincides with a vertex 420 of one of the hexagonal areas 204, and an edge 411 of the predefined area 402 adjoining the vertex 410 coincides with an edge 421 of the hexagonal area adjoining the vertex 420. Since the predefined area 402 has two possible orientations using the starting point shown in FIG. 4, this results in two possible alignments as shown in FIG. 5A and FIG. 5B.

Figure 6:
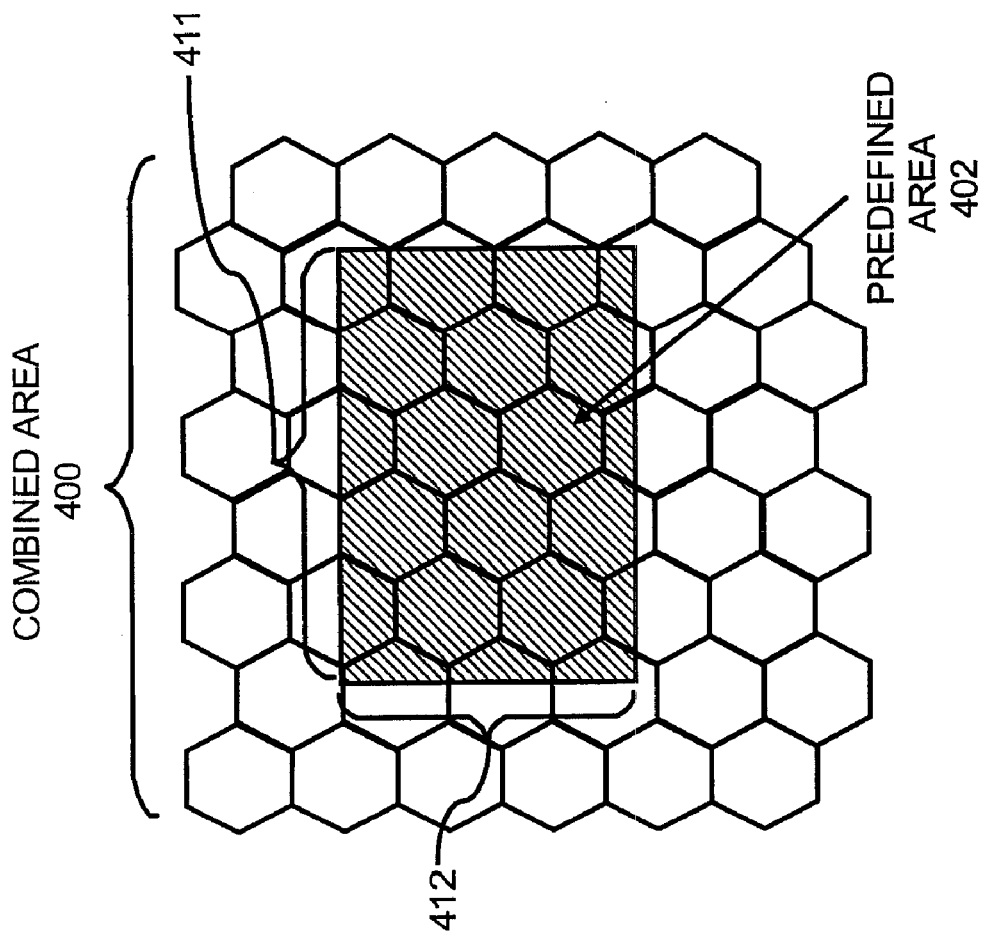
FIG. 6 shows the first type of alignment of the predefined area being moved along a direction of the coinciding edges of the predefined area and a hexagonal area, according to an embodiment of the invention.

It should be noted that each of the two possible alignments shown in FIG. 5A and FIG. 5B allows only one degree of movement along the direction of the coinciding edges 411 and 421. The aligned predefined area 402 is only allowed to move along the direction of the coinciding edges 411 and 412 until it touches the vertex of an end hexagonal area which is covered by the predefined area 402. With respect to FIG. 6, there is shown an example of the aligned predefined area 402 in FIG. 5A being moved along the direction of the coinciding edges 411 and 421 until it touches the vertex of the end hexagonal area.

The alignment having the fewest number of the hexagonal areas 204 which are either fully or partially covered by the predefined area 402 corresponds to the optimized alignment of the predefined area 402 with the combined area 400. The calculation of the number of the hexagonal areas 204 fully or partially covered by the predefined area 402 will now be described with reference to FIG. 7 and FIG. 8.

Figure 7:
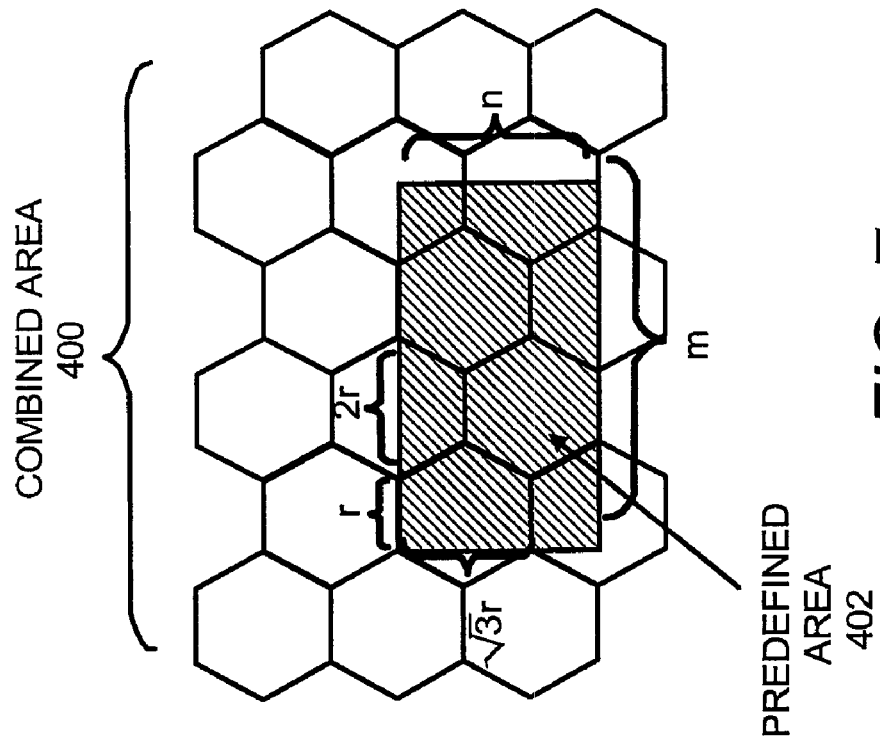
FIG. 7 shows a close-up view of a predefined area being aligned with a combined area, according to an embodiment of the invention.

FIG. 7 shows a predefined area 402 being aligned on a combined area 400. The predefined area 402 has a length m and a width n. The length of each edge of the hexagonal areas 204 is r (which is also the length from the center to each vertex of the hexagonal areas 204). The number of hexagonal areas 204 which are either fully or partially covered by the predefined area 402 is:

$$Z = x*y + V_{additional} - \delta.\qquad\text{Equation (1)}$$

In Equation (1), Z is the number of the hexagonal area 204 covered by the predefined area 402, x is the number of the hexagonal areas 204 in the horizontal direction (see edge 411 of FIG. 4), y is the number of the hexagonal areas 204 in the vertical direction (see edge 412 of FIG. 4), $V_{additional}$ is the additional hexagonal area(s), and $\delta$ is a correction factor for certain boundary conditions.

The length covered by the edge 411, shown in FIG. 4, of the predefined area 402 is an addition of r and 2r in alternates. Therefore, the number of complete "r-2r" pairs is $$\left\lfloor \frac{m}{3r} \right\rfloor.$$

Since each "r-2r" covers 2 of the hexagonal areas 204, the number of hexagonal areas 204 in the complete "r-2r" pair is:

$$H_{complete} = 2\left(\left\lfloor \frac{m}{3r} \right\rfloor\right).\qquad\text{Equation (2)}$$

In Equation (2), $H_{complete}$ is the number of the hexagonal areas 204 in the complete "r-2r" pair.

The fractional "r-2r" pair, if any, at the end of the predefined area 402 is $$\frac{m}{3r} - \left\lfloor \frac{m}{3r} \right\rfloor.$$

Therefore, the number of "r" in the fractional "r-2r" pair is:

$$E_{fraction} = 3\left(\frac{m}{3r} - \left\lfloor \frac{m}{3r} \right\rfloor\right).\qquad\text{Equation (3)}$$

In Equation (3), $E_{fraction}$, is the number of "r" in the fractional "r-2r" pair.

Figure 8:
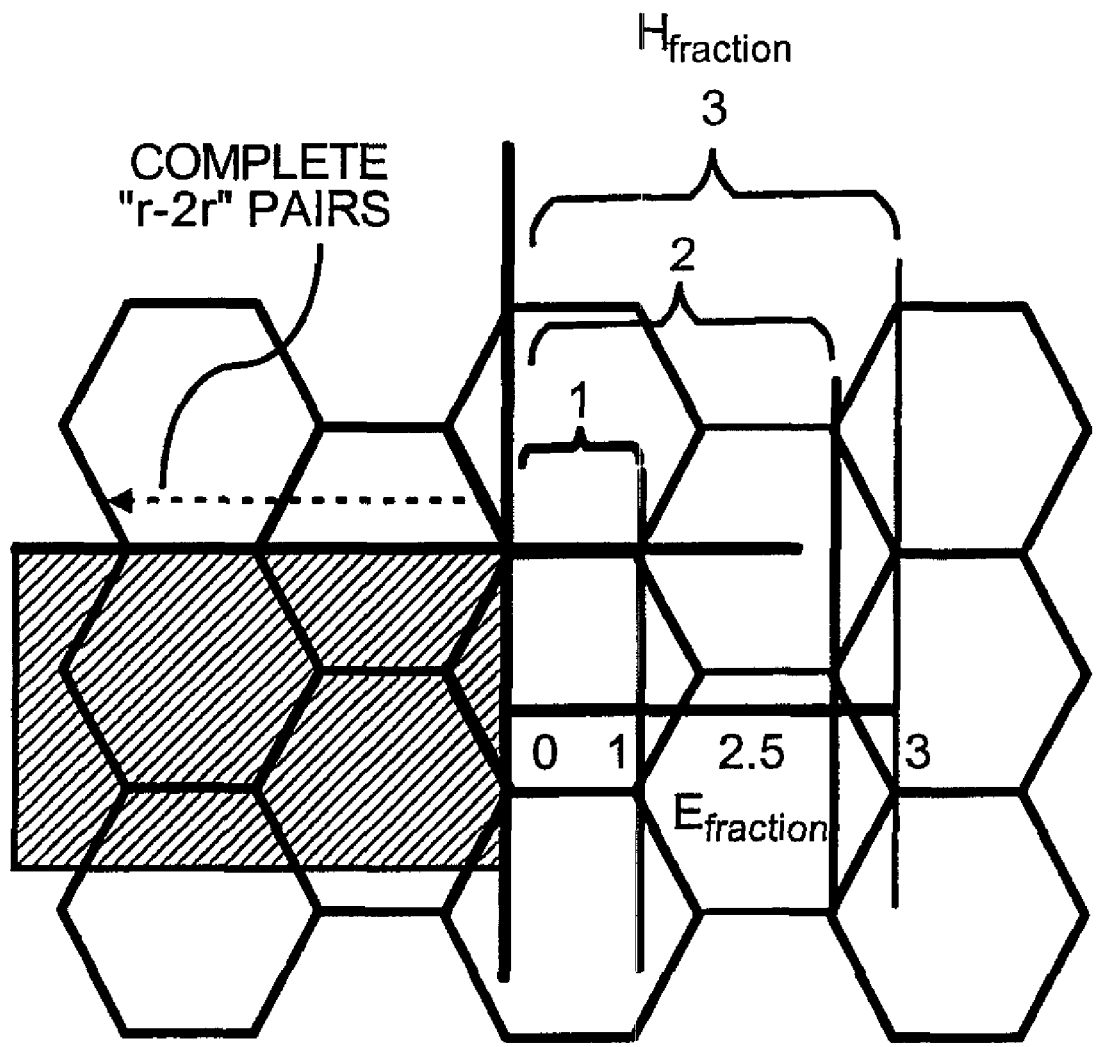
FIG. 8 shows an illustration of the number of hexagonal areas that are needed ($H_{fraction}$) for different values of $E_{fraction}$, according to an embodiment of the invention.

FIG. 8 shows an illustration of the number of hexagonal areas 204 that are needed ($H_{fraction}$) for different values of $E_{fraction}$ according to an embodiment. As can be seen from FIG. 8, when $E_{fraction}$ is between 0 and 1, the number of hexagonal areas 204 needed to cover the fractional "r-2r" pair is 1. When $E_{fraction}$ is more than 1 but equal but less than 2.5, the number of the hexagonal areas 204 needed to cover the fractional "r-2r" pair is 2. When $E_{fraction}$ is more than 2.5 but less than 3, the number of the hexagonal areas 204 needed to cover the fractional "r-2r" pair is 3. The relationship between the number of the hexagonal areas 204 needed to cover the fractional "r-2r" pair and $E_{fraction}$ can be summarized using the following equation:

$$H_{fraction} = \begin{cases} 1, & \text{if } 0 \leq E_{frac} \leq 1 \\ 2, & \text{if } 1 < E_{frac} \leq 2.5 \\ 3, & \text{if } 2.5 < E_{frac} < 3. \end{cases}\qquad\text{Equation (4)}$$

In Equation (4), $H_{fraction}$ is the number of hexagonal areas 204 needed to cover the fractional "r-2r" pair. Therefore, the total number of hexagonal areas 204 covered by the predefined area 402 in the horizontal direction x is:

$$x = H_{complete} + H_{fraction}.\qquad\text{Equation (5)}$$

The length covered by the edge 412, shown in FIG. 4, of the predefined area 402 is $\sqrt{3}r$ for each hexagonal area covered. Therefore, the number of the hexagonal areas 204 covered by the predefined area 402 in the vertical direction y covered by the predefined area 402 in the vertical direction y is:

$$y = \frac{n}{\sqrt{3}\,r}.\qquad\text{Equation (6)}$$

In Equation (6), If $$\frac{n}{\sqrt{3}\,r} - y$$

is greater than 0.5, then additional hexagonal areas may be added to the total number of hexagonal areas 204 covered by the predefined area 402. In other words, if $\sqrt{3}(y+0.5)r < n$, then:

$$V_{additional} = \left\lfloor \frac{x}{2} \right\rfloor.\qquad\text{Equation (7)}$$

In addition, two cases of boundary conditions may be considered. The first case that may be considered occurs when:

$$1 < E_{fraction} < 1.5, \text{ and}\qquad\text{Equation (8)}$$

$$\sqrt{3}(y-0.5)r < n < \sqrt{3}(y)r.\qquad\text{Equation (9)}$$

In this case the correction factor is:

$$\delta = \begin{cases} 1, & \text{if } (n - \sqrt{3}\,r(y-0.5)) + (E_{fraction}-1)r \leq \frac{\sqrt{3}\,r}{2}. \\ 0, & \text{if otherwise} \end{cases}\qquad\text{Equation (10)}$$

The second case that may be considered is when:

$$2.5 < E_{fraction} < 3, \text{ and}\qquad\text{Equation (11)}$$

$$\sqrt{3}(y-1)r < n < \sqrt{3}(y0.5)r.\qquad\text{Equation (12)}$$

In this case the correction factor is:

$$\delta = \begin{cases} 1, & \text{if } (n - \sqrt{3}\,r(y-1)) + (E_{fraction} - 2.5)r \le \dfrac{\sqrt{3}\,r}{2}. \\ 0, & \text{if otherwise} \end{cases} \quad \text{Equation (13)}$$

Combining Equations (10) and (13), the correction factor is determined using the following expression:

$$\delta = \begin{cases} 1, \text{if } (n - \sqrt{3}\,r(y-0.5)) + (E_{frac} - 1)r \le \dfrac{\sqrt{3}\,r}{2} \text{ and} \\ \quad 1 < E_{fraction} < 1.5 \text{ and } \sqrt{3}\,(y - 0.5)r < n < \sqrt{3}\,(y)r. \\ 1, \text{if } (n - \sqrt{3}\,r(y-1)) + (E_{frac} - 2.5)r \le \dfrac{\sqrt{3}\,r}{2} \text{ and} \\ \quad 2.5 < E_{fraction} < 3 \text{ and } \sqrt{3}\,(y - 1)r < n < \sqrt{3}\,(y0.5)r \\ 0, \text{ otherwise.} \end{cases} \quad \text{Equation (14)}$$

Combining Equations (1), (2), (4), (5) and (6), the total number of hexagonal areas covered by the predefined area 402 is:

$$Z = \left[2\left(\left\lfloor\dfrac{m}{3r}\right\rfloor\right) + H_{fraction}\right] * \left\lfloor\dfrac{n}{\sqrt{3}\,r}\right\rfloor + V_{additional} - \delta. \quad \text{Equation (15)}$$

In Equation (15), $V_{additional}$ is determined using Equation (7) and $\delta$ is determined using Equation (14). The alignment of the predefined area 402 with the combined area 400 which covers the fewest number of hexagonal areas (that is, the lowest value of Z) is the optimized alignment of the predefined area 402 with the combined area 400.

Using the optimized alignment of the predefined area 402 with the combined area 400 determined as described above, the hexagonal areas 204, which are fully or partially covered by the predefined area 402 may be determined, for example, by physically marking the hexagonal areas 204. The center of each of the hexagonal areas 204 determined to be fully or partially covered by the predefined area 402 corresponds to a read point 202. In an embodiment, one or more static RFID readers may be placed within the predefined area 402 at each of the determined read points 202. Accordingly, a full coverage of the predefined area 402 by the RFID readers is achieved.

In an alternative embodiment, or in addition to the use of static RFID readers, one or more mobile RFID readers, such as the reader 106, shown in FIG. 1, may be used. For example, the guide tracks 102a and 102b may be placed on either side of the predefined area 402, such that the predefined area 402 is equivalent to the zone 101 or 206. Therefore, the channel 104 may be moved across the predefined area 402 along the guide tracks 102a and 102b and the reader 106 may be moved along the channel 104 to position the reader 106 at one or more of the read points 202. The reader 106 may also be raised or lowered to an optimum position in the vertical or Z-axis. The size and number of zones, such as the zones 101 or 206, will depend on the dimensions of the predefined area 402, tag volume, tag density, reader capacity and range, as well as the maximum length of the channel 104. However, as mentioned above, while the zones may define travel boundaries of a reader, the zones do not necessarily demarcate a closed reading area because a reader 106 may read tags outside of the zone in which the reader 106 is located and/or in adjacent zones also.

In one embodiment, the reader 106 may be moved along a predefined path to each of the read points 202 to read RFID information from RFID tags located anywhere in the predefined area 402. For example, a predefined path of the reader 106 may involve passing the reader 106 through all the read points 202 (FIG. 2). In other embodiments, however, the predefined path may include only a portion of the read points 202. For instance, the predefined area 402 may be a warehouse having unused or otherwise unavailable portions. In such a case, the predefined path may omit the read points 202 associated with the unused or unavailable portions of the predefined area 402. The reader 106 may be moved through the predetermined path and paused at each of the read points 202. As set forth above, pausing the reader 106 may include stopping the reader for uniform or varied durations of time at each of the read points 202. While paused at the read points 202, the reader 106 may scan for RFID tags and read any information from any RFID tags within its reading range.

Scanning for RFID tags may include transmitting an RF signal. The RF signal may activate passive RFID tags, which transmit a responding signal. Alternatively, or in addition thereto, scanning may include simply "listening for" and reading RF signals transmitted by RFID tags powered from a source other than the RFID reader. In any event, information from RFID tags in the predefined area may be obtained, stored, and/or passed to another device.

After the reader 106 has stopped at one of the read points 202, the reader 106 may be moved to a next read point 202 along the predetermined path. At the next read point 202, the reader 106 may also pause and scan for RFID tags before proceeding to another read point 202, until the reader 202 reaches the end of the predefined path. Thereafter, the reader 106 may return to the start point of the predefined path to repeat the process, reverse its direction along the predefined path, or begin moving along a different path.

By moving the reader 106 to multiple read points 202 instead of dedicating a static reader to every determined read point, possible interference between adjacent readers is avoided or greatly reduced. This greatly increases the reliability and efficiency of the RFID system.

Turning again to FIG. 2, the number pairs inside of the circles representing the read points 202 indicate relative coordinates or identifiers of each of the read points 202. The first number of the number pairs represents a position in the X dimension while the second number in the number pairs represents a position in the Y dimension. In this manner, the read points 202 may be identified by their locations in relation to each other. Although only the X and Y coordinates are shown in FIG. 2, it should be understood that the Z coordinate may also be determined and utilized. For example, if the guide tracks 102a and 102b, described above with respect to FIG. 1, are mounted to a ceiling or otherwise above the floor, of a predefined area the reader 106 may be dynamically suspended from the channel 104 such that the reader 106 is operable to be raised and lowered therefrom. In such a case, the Z coordinate may be used to determine the optimal height at which the reader 106 should be positioned in the predefined area 402 to scan for RFID tags. In such a 3-dimensional case, hexagonal cylinders instead of hexagonal areas 204 are used to determine the 3-dimensional locations for positioning the reader 106. The coordinates of the locations for placing the RFID readers would be represented as $(x_r, y_r, z_r)$, where $z_r$ is the z-coordinate.

The absolute locations of the read points 202 may also be calculated. That is, the physical locations within the predefined area 402 of the center of each of the hexagonal areas 204 may be determined. For example, if the predefined area 402 is a warehouse or other building, it may be determined how many meters, centimeters, feet, inches, etc., the various read points 202 are from various known positions, such as a corner of the predefined area 402 or a wall of the predefined area 402. In one embodiment, the absolute coordinates may be determined by designating the top left corner, as shown in FIG. 2, of the zone 206 as the origin, or (0, 0, 0). If the relative coordinates are $x_r$, $y_r$, $z_r$=0, the absolute coordinates $X_{abs}$, $Y_{abs}$, and $Z_{abs}$ of the center of the hexagonal areas 204 from the top-left corner may be calculated using the following equations, where "r" is the radius of the read range of the reader 106:

$$X_{abs} = \frac{r(3x_i - 2)}{2},\qquad \text{Equation (16)}$$

$$Y_{abs} = \frac{\sqrt{3}\, r(2y_i - 1)}{2},\qquad \text{Equation (17)}$$

if $x_i$ is an odd number, and $$Y_{abs}\sqrt{3}r(y_i-1),\ \text{if } x_i \text{ is an even number.}\qquad \text{Equation (18)}$$

Due to variations in the range of various readers and changing conditions inside the predefined area that affect readers, such as, environmental conditions, the absolute coordinates of the read points 202 may vary in different predefined areas, which have substantially similar dimensions. For example, two rectangular warehouses having the same length, width, and height, may require different read points 202 even when identical readers are used. The number of read points 202 in each direction will also depend on the actual dimensions of the predefined area 402, of course. Therefore, a map table of the read points 202 may be maintained to properly guide and position the reader 106 inside the zone 101 or 206. For example, the map table may include the number of each of the read points 202 and the relative and absolute coordinates of each of the read points 202, as shown below:

| Read Point #s | Relative Coordinates | Absolute Coordinates |
|---|---|---|
| 1 | (1, 1) | (100, 100) |
| 2 | (1, 2) | (100, 200) |
| 3 | (2, 1) | (250, 150) |
| 4 | (2, 1) | (400, 250) |
| 5 | ... | ... |

The map table shown above is just one possible example of a map table, which may be utilized with the systems and methods described herein. The map table shown above includes the number of each of the read points 202, which may be indicative of the order in which the reader 106 is moved in a predefined path or may simply be a random designation of the read points 202. The map table includes relative coordinates, which may be substantially similar to the relative coordinates shown within the circles of FIG. 2. The map table also includes the absolute coordinates of each of the read points 202, which may be determined using the methods described above. The map table might be stored within a reader controller application or may be stored in the reader 106, itself, as will be described in greater detail below.

As mentioned above, the map table may be used to guide and position the reader 106 at the correct read points 202. For instance, when the reader 106 is required to move from point 2 to 3, the reader 106 may be provided with the relative coordinates as part of a movement instruction. The map table may be referenced to correlate the relative coordinates to the absolute coordinates so that it is known how many inches, centimeters, etc, the reader 106 must move. The use of the map table may aid in insulating various RFID system applications from the details of specific implementation and idiosyncrasies arising out of differences in reader specifications.

However, in other embodiments, the reader 106 may simply be given the movement instructions in terms of absolute movements, such as 150 inches in X direction and −50 inches in Y direction. In other examples, complex movements, such as a move from point 1 to 4, may require the reader to traverse through a number of intermediate points and will benefit from the use route optimization algorithms. Standard algorithms from graph theory and combinatorial optimization disciplines can be used for route optimization. For example, shortest path (for instance, Dijkstra's Algorithm) algorithms, minimum spanning trees algorithms, minimum weight spanning tree (for instance, Kruskal's Algorithm) algorithms, Traveling Salesman Problem algorithms, heuristics based solutions, etc., may be used. It should be noted that which algorithm to be used depends on the problem, environment and any available data.

It is also possible to sub-divide the predefined area 402 into sub-areas. For instance, with respect to FIG. 9, there is shown an RFID system 900 having multiple zones, according to an embodiment. The RFID system 900 includes a first zone 902 and a second zone 904. The predefined area and, thus, each of the zones 902 and 904 has been tessellated according to the techniques described above and, thus, has a plurality of read points 906.

The boundaries of the zones 902 and 904 are defined by a pair of guide tracks 908a and 908b mounted on opposite boundaries of the zones 902 and 904, respectively. Each of the zones 902 and 904 further includes a channel 910a and 910b movably attached between each set of the guide tracks 908a and 908b, respectively. Each of the zones 902 and 904 also includes a mobile reader 912a and 912b movably attached to the channels 910a and 910b, respectively. Therefore, each of the zones 902 and 904 may be substantially similar to the zone 101, described above with respect to FIG. 1. In this manner the mobile readers 912a and 912b may be moved to virtually any point within the zones 902 and 904, respectively.

Figure 9:
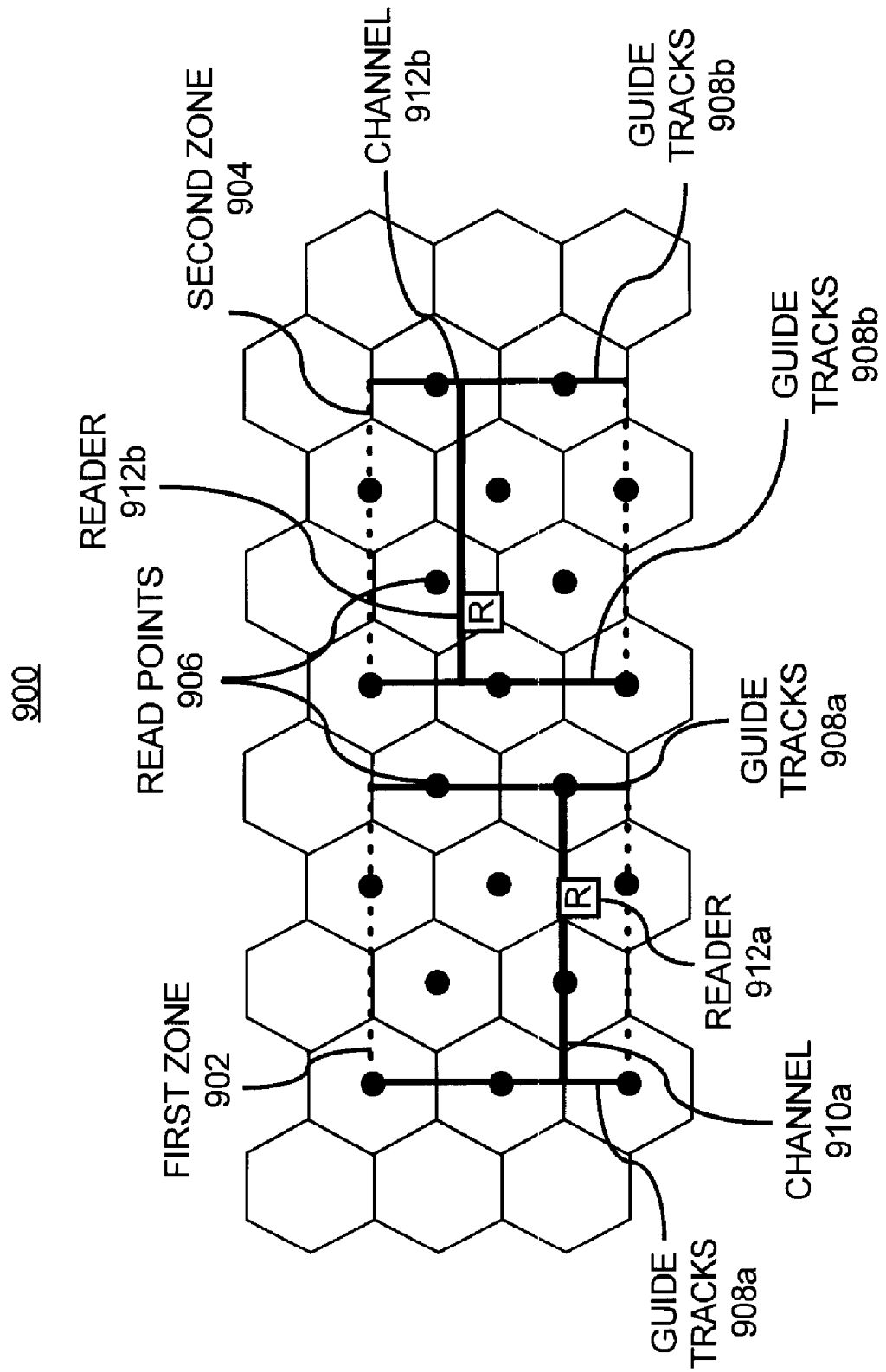
FIG. 9 shows combined area with a first and second zone, according to an embodiment of the invention.

While two different zones 902 and 904 are shown in FIG. 9, a person having ordinary skill in the art will appreciate that a predefined area may be split into any reasonably suitable number of zones. Similarly, each of the zones 902 and 904 may have one dedicated mobile reader 912a or 912b to move to each of the read points 906 in each respective zone or, in other embodiments, each of zones 902 and 904 may contain multiple readers, both static and mobile.

The mobile readers 912a and 912b may each be moved along predefined paths within their respective zones to scan for RFID tags, such that all RFID tags within each of the zones 902 and 904 are read. In addition, RFID tags located outside of the zones 902 and 904 may also be read. For example, the mobile readers 912a and 912b may be moved to the read points 906 on the inner boundaries of each of the zones 902 and 904, respectively to read RFID tags located outside of the zones 902 and 904, because the reading range of the mobile readers 912a and 912b extends to each vertex of the tessellated areas. Thus, the predefined area is monitored efficiently because RFID tags located outside of the zones 902 and 904 in areas, such as between the zones 902 and 904, may be read without having to physically move a reader into this area.

Moreover, the movement of the mobile readers 912a and 912b within each of the zones 902 and 904 may be coordinated such that the two mobile readers 912a and 912b do not come within close enough physical proximity to interfere with each other. For example, the mobile reader 912a may be moved to the middle or left side of the zone 902 while the mobile reader 912b is moved to the left side of the zone 904. In this manner, the movement of the mobile readers 912a and 912b is controlled such that the mobile readers 912a and 912b are not physically within each others reading range at the same time.

However, in other embodiments, both of the mobile readers 912a and 912b may be positioned in close enough proximity to each other that their respective reading ranges overlap. To avoid interference in this situation, the scan timing of each of the mobile readers 912a and 912b may be coordinated, such that only one of the mobile readers 912a and 912b is actively scanning at a particular moment in time. In this manner, interference between the two mobile readers 912a and 912b is reduced or eliminated because both of the readers 912a and 912b are not actively scanning at the same time.

The location of the guide tracks 908a and 908b and, thus, the boundaries of the zones 902 and 904 may be very close to the derived read points 906. In fact, the placement of the guide tracks 908a and 908b shown in FIG. 9 is substantially in line with various read points 906. This provides the maximum read point coverage to a channel and reader combination. However, in other embodiments the boundary of the zones 902 and 904 may not be close to any of the read points 906, because the guide tracks 908a and 908b are relatively fixed while the read points 906 are dependant on the reader range. Therefore, if the read range of a reader changes, the read points 906 may also change. The location of the guide tracks 908a and 908b is described as relatively fixed because the guide tracks 908a and 908b may be bolted, glued, or otherwise fastened at a particular location. Therefore, while it is possible to detach, move, and re-attach the guide tracks 908a and 908b doing so may require manual labor as opposed to the automated movement of the channels 912a and 912b along the guide tracks 908a and 908b and the readers 912a and 912b along the channels 912a and 912b, respectively.

Figure 10:
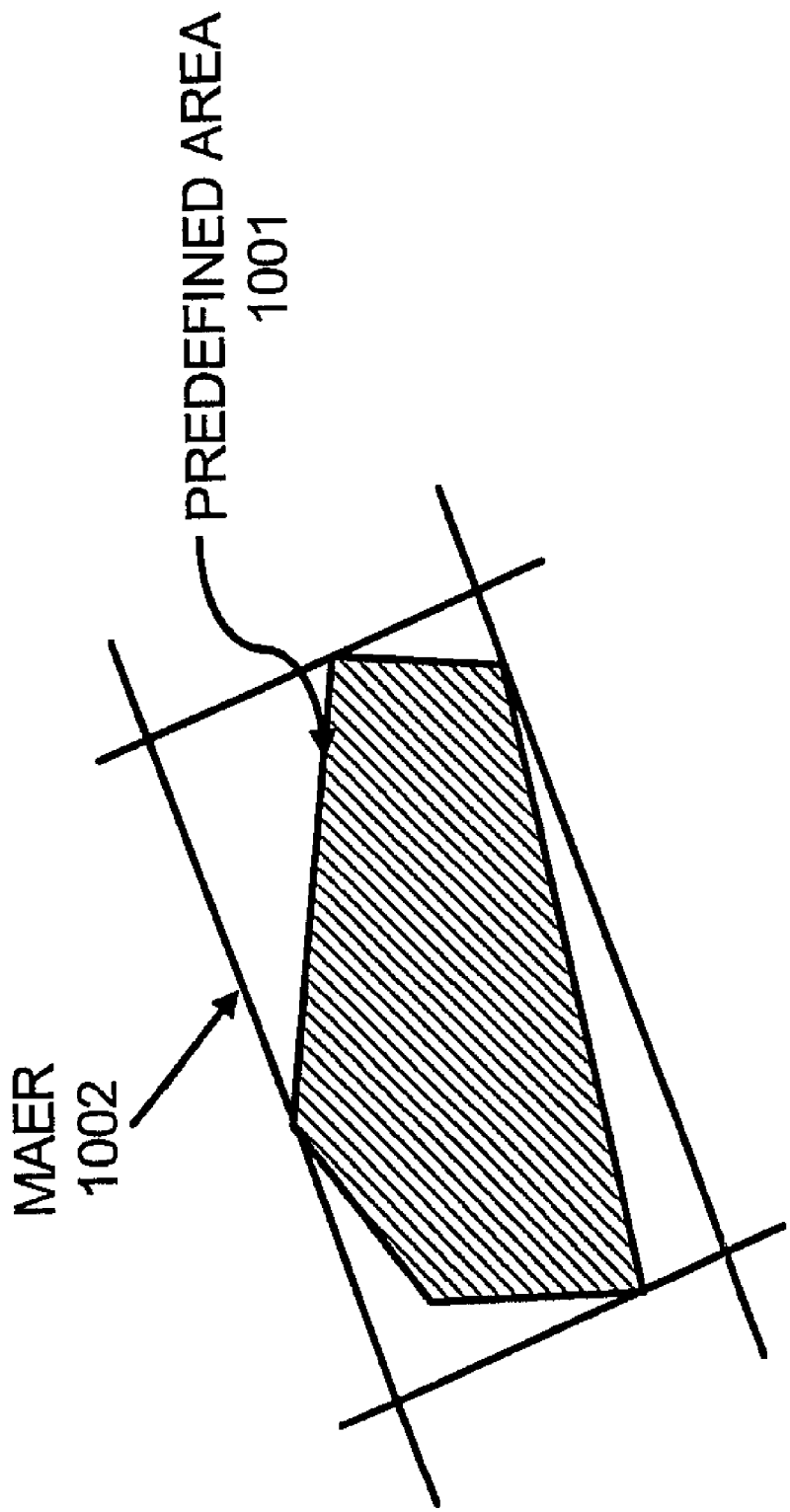
FIG. 10 shows a minimum area enclosing rectangle (MAER) for a polygonal shape, according to an embodiment of the invention.

With respect to FIG. 10, there is shown a non-rectangular predefined area 1001. For example, the predefined area 1001 may represent a warehouse or other storage location having any reasonably suitable polygonal shape. Optimized read points within the predefined area 1001 may be determined by creating a minimum area enclosing rectangle (MAER) 1002 around the predefined area 1001. The MAER 1001 may be determined using existing techniques, such as the rotating calipers algorithm. Optimized read points within the predefined area 1001 for pausing an RFID reader and scanning for RFID tags may be determined according to the methods as described in the above embodiments.

Figure 11:
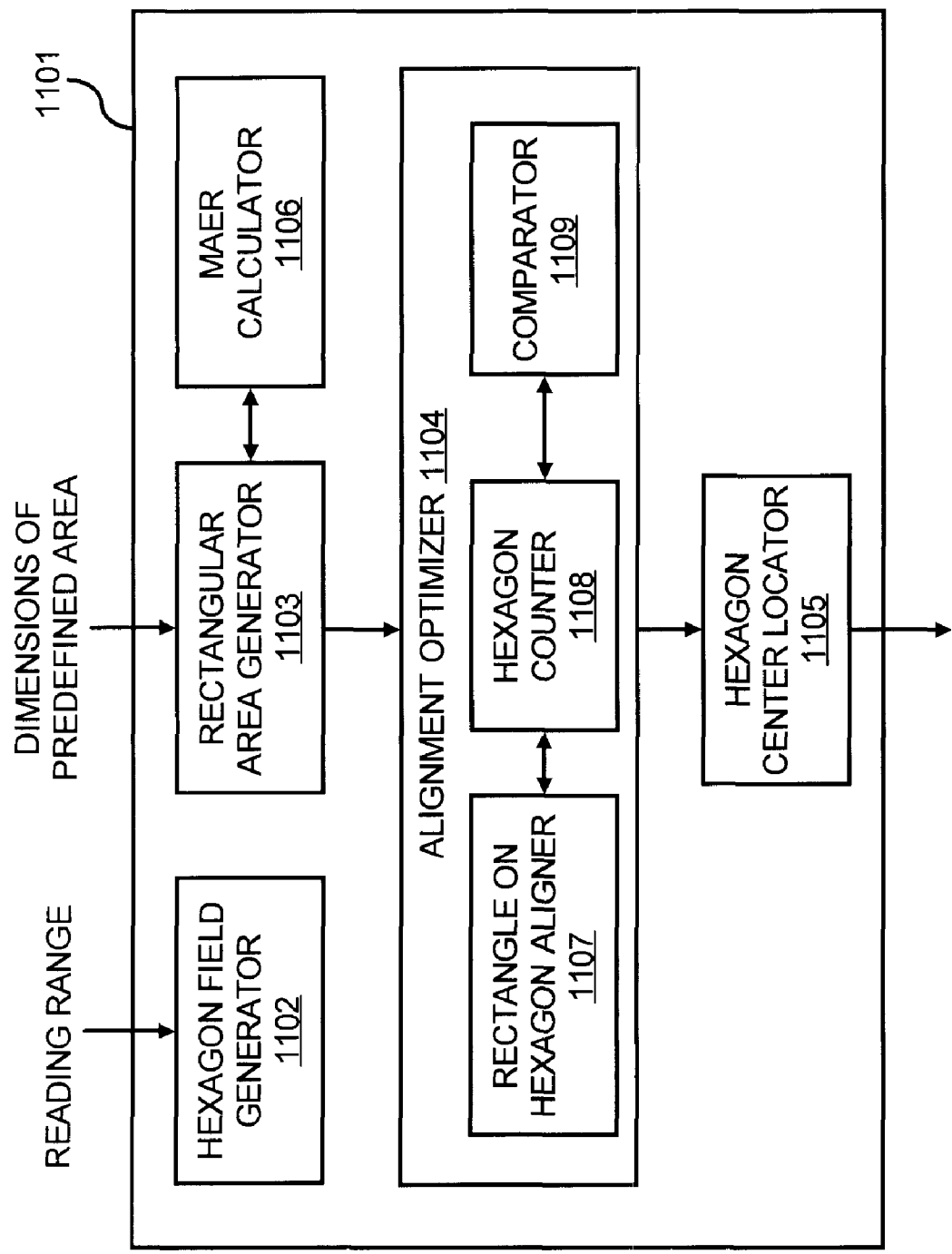
FIG. 11 shows a block diagram of a location optimizing unit for determining read points, according to an embodiment of the invention.

With respect to FIG. 11, there is shown a block diagram of a location optimizing unit for determining optimized read points in a predefined area, according to an embodiment. The location optimizing unit 1101 includes a hexagon field generator 1102, a rectangular area generator 1103, a MAER calculator 1106, an alignment optimizer 1104, and a hexagon center locator 1105.

The hexagon field generator 1102 receives the reading range of a reader as input and generates the combined area which is comprised of the honeycomb of hexagonal areas. As previously described, each hexagonal area represents the circular reading range of the reader, and the length of each side of the hexagonal areas is equal to the radius r of the circular reading range.

The rectangular area generator 1103 receives the dimensions of the predefined area, for example a warehouse, as input and generates a rectangular area representing the predefined area or the warehouse. In the case where the predefined area is a non-rectangular shape, the rectangular area generator 1103 passes the dimensions of the predefined area to the MAER calculator 1106 to determine the smallest rectangle that encloses the predefined area. The MAER calculator 1106 returns the dimensions of the smallest rectangle to the rectangular area generator 1103.

The alignment optimizer 1104 receives the combined area from the hexagon field generator 1102 and the rectangular area from the rectangular area generator 1103 as inputs and determines an optimized alignment of the rectangular area with the combined area in such a way that the rectangular area totally or partially covers a minimum number of hexagonal areas. The optimized alignment may be generated according to the method described above. The alignment optimizer 1104 generates as output a combined hexagonal field (represented by the hexagonal areas totally or partially covered by the predefined area) covering the predefined area or the warehouse.

The hexagon center locator 1105 receives the combined hexagonal field from the alignment optimizer 1104 as input, and determines a list of coordinates of the center of each of the hexagonal area of the combined hexagonal field. The list of coordinates corresponds to the locations for putting a RFID reader in order to obtain a full coverage of the predefined area.

In an embodiment, the alignment optimizer 1104 includes a rectangle on hexagon aligner 1107, a hexagon counter 1108 and a comparator 1109. The rectangle on hexagon aligner 1107 receives the combined area and the rectangular area, and aligns the rectangular area on the combined area in all possible ways in order to generate the most optimized alignment.

For each alignment generated by the rectangle on hexagon aligner 1107, the hexagon counter 1108 calculates the number of hexagonal areas of the combined area that are fully or partially covered by the predefined area. The number of hexagonal areas may be calculated using equation (15) described above.

The comparator 1109 compares the number of hexagonal areas of the various alignments and identifies the alignment which requires the minimum number of hexagonal areas. The alignment requiring the minimum number of hexagonal areas is the optimized alignment of the rectangular area with the combined area as determined by the alignment optimizer 1104.

Figure 12:
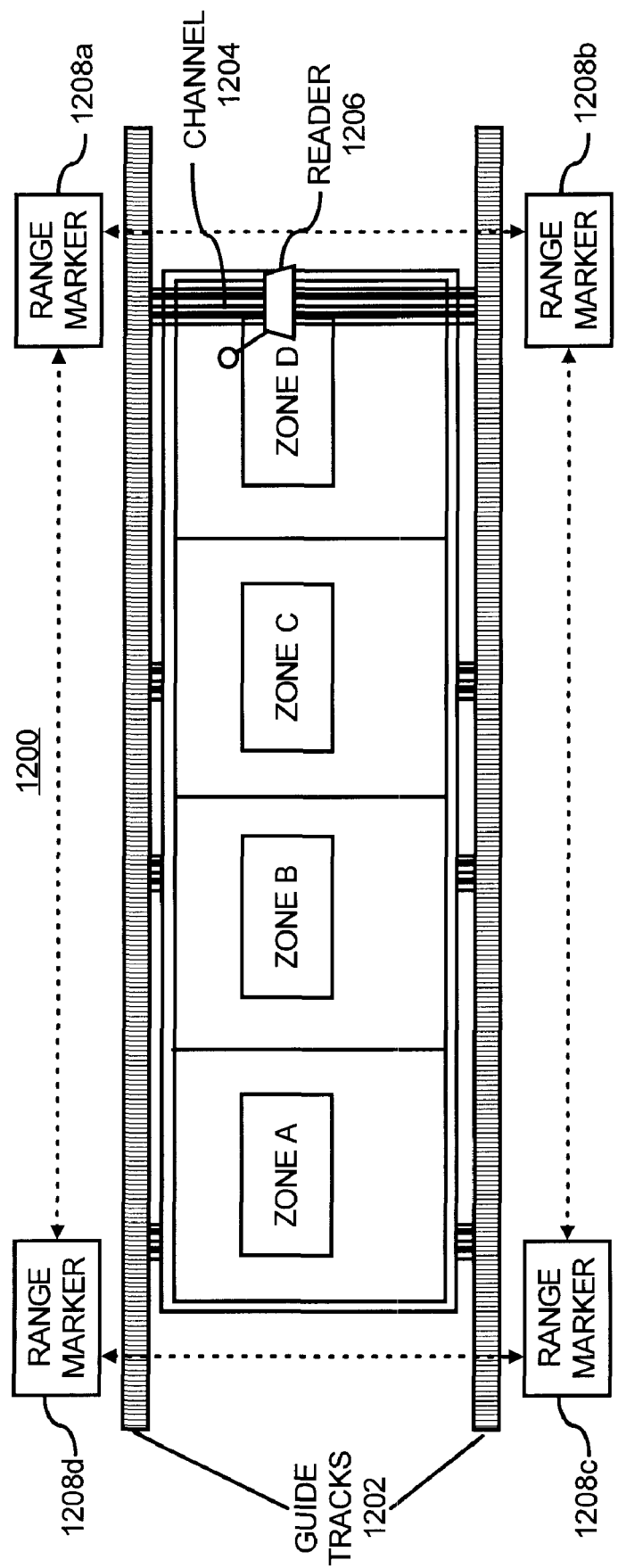
FIG. 12 shows an RFID system, according to another embodiment of the invention.

With respect to FIG. 12, there is shown an RFID system 1200, according to another embodiment. Although particular reference has been made herein below to the RFID system 1200 as including particular features, it should be understood that the RFID system 1200 may include additional components and that some of the components described may be removed and/or modified without departing from a scope of the RFID system 1200.

The RFID system 1200 includes a pair of guide tracks 1202, a channel 1204, and a reader 1206. These components may be substantially similar to the complimentary components described above with respect to FIG. 1 and FIG. 9. The RFID system 1200 includes four different zones A-D, between the guide tracks 1202. Therefore, the channel 1204 may move along the guide tracks 1202 through each of the zones A-D and the reader 1206 may move along the channel 1204 to different positions within the zones A-D. Although not shown in FIG. 12, the zones A-D may be tessellated and read points within the zones A-D may be determined according to the embodiments described above. Therefore, the reader 1206 may move through and pause at different positions within the zones A-D to read RFID tags.

In order to accurately determine the location of the reader 1206 and to precisely control the movement of the reader 1206 to specific positions, the RFID system 1200, according the embodiment shown in FIG. 12, includes range markers 1208a-1208d. The range markers 1208a-1208d comprise devices, which allow the location of the channel 1204 and the reader 1206 to be determined. For example, the range markers 1208a-1208d may include sensors and/or transponders, which communicate with each other and with the reader 1206. In one embodiment, one or more of the range markers 1208a-1208d may include a GPS device to determine position information or may be pre-programmed with position information. As such, the range markers 1208a-1208d may also serve the purpose of defining the dimensions of one or more of the zones A-D and/or the entire predefined area. The reader 1206 and one or more of the markers 1208a-1208d may transmit signals there between to determine the distance from the reader 1206 to one or more of the markers 1208a-1208d. In this manner, the position of the reader 1206 between the markers 1208a-1208d may be determined with a relatively high degree of accuracy.

Alternatively, or in addition thereto, the precise control of the movement and position of the channel 1204 and/or the reader 1206 may also be achieved in other ways. For instance, precision stepper motors operable to calculate and precisely control the direction and degree of movement may be deployed to control the movement of the reader 1206 and/or the channel 1204. In this manner, the motor itself may keep track of the precise distance that the motor has moved the channel 1204 or the reader 1206.

Positional Identifiers on the guide tracks 1202 and/or the channel 1204 may also be used. Positional identifiers include the graduated markings described above with respect to FIG. 1. Positional identifiers also include electronic markers that may be identified by sensors on the channel 1204 and/or the reader 1206. In an embodiment, positional identifiers may include equidistant grooves in the guide tracks 1202 and/or the channel 1204 where gears used to move the channel 1204 or the reader 1206 will mesh with the grooves during movement. These positional identifiers serve as a channel position and movement guides.

Movement may also be controlled using inertial navigation sensors, which are sensors that determine direction and amount of motion along each axis of movement. Inertial navigation sensors may continuously check and control the motion of the channel 1204 and/or the reader 1206.

Figure 13:
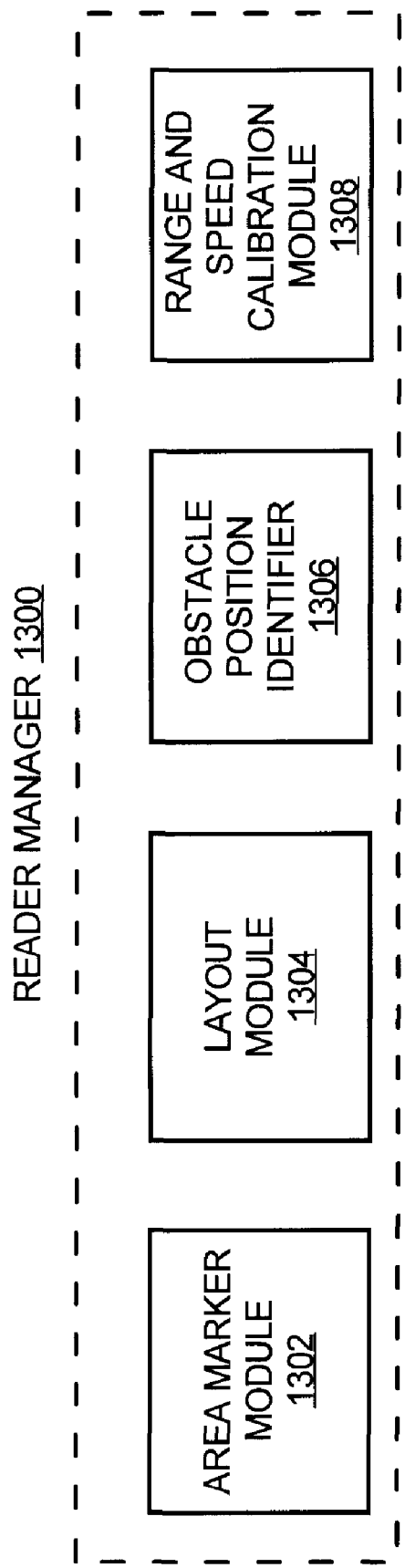
FIG. 13 shows a block diagram of a reader manager, according to an embodiment of the invention.

With respect to FIG. 13, there is shown a reader manager 1300, according to another embodiment. Although particular reference has been made herein below to the reader manager 1300 as including particular features, it should be understood that the reader manager 1300 may include additional components and that some of the components described may be removed and/or modified without departing from a scope of the reader manager 1300.

The reader manager 1300 may be configured to control the movement of a reader, such as the readers 106 and 1206, described above with respect to FIGS. 1 and 12, respectively. The reader manager 1300 may be an integrated component of a reader or may be a separate component not physically associated with a reader, as will be described in greater detail below. The reader manager 1300 includes an area marker module 1302, a layout marker module 1304, an obstacle position identifier 1306, and a range and speed calibration module 1308, each of which may comprise hardware, software, firmware, or a combination thereof. The area marker module 1302 may receive data collected by the range markers 1208a-1208d, described above with respect to FIG. 12. In one example, one or more of the range markers 1208a-1208d may collect information from the other range markers 1208a-1208d and wirelessly transmit the collected information to the area marker module 1302. For example, the area marker 1302 may receive the relative or absolute coordinates of one or more of the range markers 1208a-1208d. This data may be used to determine the position of the reader in relation to the range markers 1208a-1208d.

The layout module 1304 may contain information regarding the dimensions of the predefined area in which the reader is configured to move. For example, the layout module 1304 may either be pre-programmed with data regarding the shape and dimensions of one or more zones or may utilize the data received from the area marker module 1302 to determine the shape and dimensions of the predefined area. The obstacle position identifier 1306 may contain data regarding obstacles in the predefined area that the reader must navigate around. For instance, a reader may be suspended from a ceiling of a warehouse and may have to navigate around ducts or other HVAC equipment mounted to the ceiling. Data about obstacles may be pre-programmed into the obstacle position identifier 1306 or the obstacle position identifier 1306 may store the coordinates of obstacles as they are encountered by a reader in real-time.

The range and speed calibration module 1308 monitors the distance and speed at which the reader moves. When a determination is made that the reader needs to move to a read point, the range and speed calibration module 1308 determines the distance the reader must move to reach the read point and the time it will take the reader to move to the read point at a certain speed. The range and speed calibration module 1308 monitors the readers movement to ensure the reader is moving at the correct speed for the correct duration of time.

Figure 14:
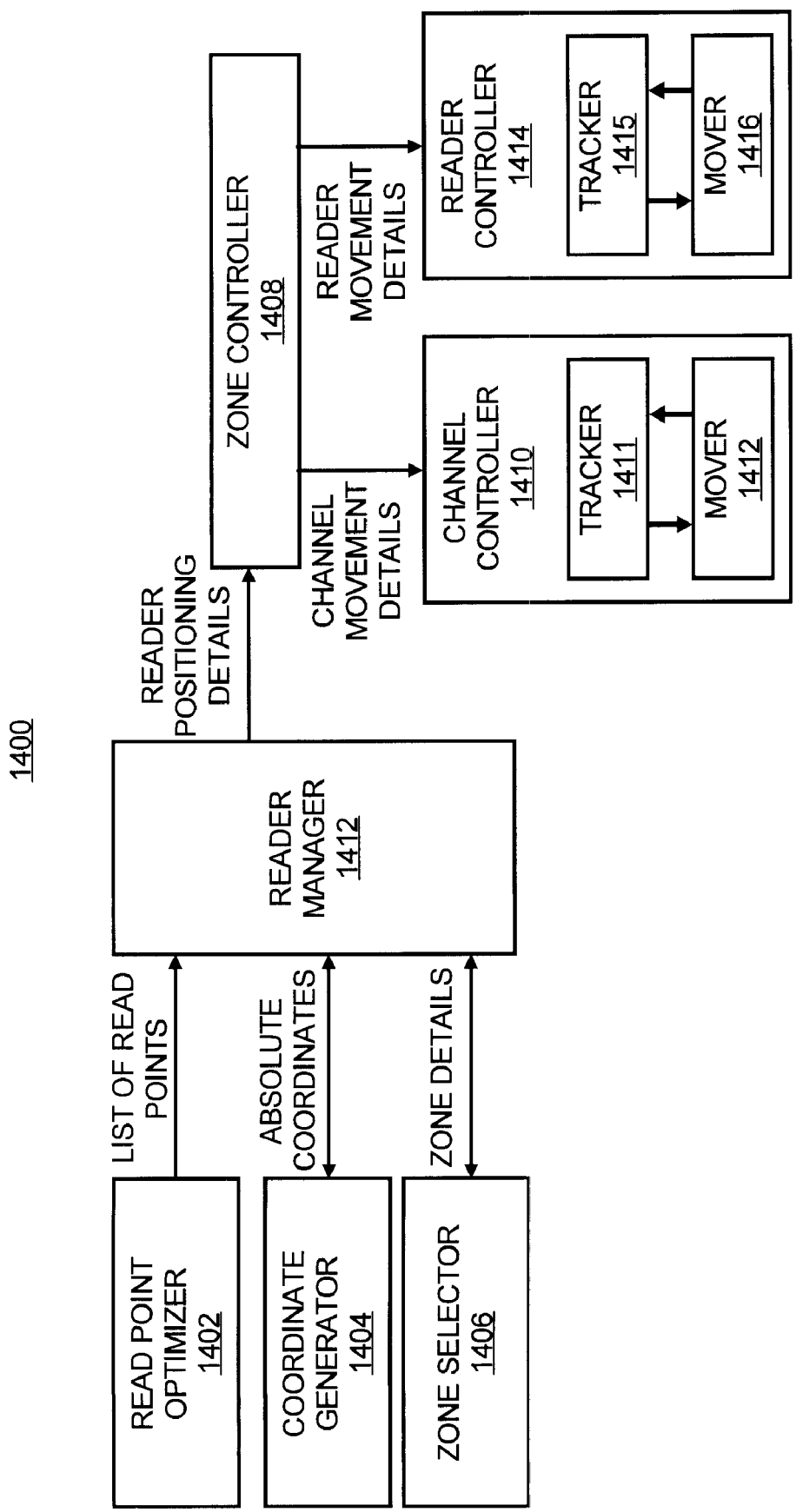
FIG. 14 shows a block diagram of an RFID control system, according to an embodiment of the invention.

With respect to FIG. 14, there is shown an RFID control system 1400, according to another embodiment. Although particular reference has been made herein below to the RFID control system 1400 as including particular features, it should be understood that the RFID control system 1400 may include additional components and that some of the components described may be removed and/or modified without departing from a scope of the RFID control system 1400.

The RFID control system 1400 shows various components, which may be used to determine read points and control the movement of a reader through a predefined area to scan for RFID tags at the read points. The components shown in the RFID control system 1400 may be integrated into a reader or some or all of the components may be physically independent from the reader. For example, one or more of the components shown in the RFID control system 1400 may be part of a computer system located within the predefined area or at a remote monitoring location. In one embodiment, a central monitoring station may monitor multiple predefined areas each of which has an RFID tracking system.

The RFID control system 1400 includes a reader manager 1412, which may be substantially similar to the reader manager 1300, described above with respect to FIG. 13. Thus, the reader manager 1412 may be a central module designed to govern the movement of one or more readers in a predefined area, such as a warehouse. The reader manager 1412 may interact with all the other modules in the RFID control system

1400. When the reader manager 1412 receives a read command, the reader manager 1412 may position the appropriate reader at the appropriate read point to scan for RFID tags.

A read point optimizer 1402 may act as the brain of the RFID control system 1400. For instance, the read point optimizer 1402 may collect and evaluate data from the area marker module 1302, the obstacle position identifier 1306, and the range and speed calibration module 1308. The read point optimizer 1402 may identify the read point based on the reader range and the warehouse dimensions. In this manner, the reader does not need to be pre-programmed with the coordinates of the read points, because the read point optimizer 1402 may automatically determine the read points by collecting the necessary information and utilizing the techniques described above. For example, in the case of a non-rectangular warehouse, the read point optimizer 1402 will perform the calculations based on a minimum area bounding rectangle. The read point optimizer 1402 may provide the relative and/or absolute coordinates of the read points to the reader manager 1412.

A coordinate generator 1404 may receive relative coordinates and determine the absolute coordinates of the read points. For example, the coordinate generator 1404 may access a map table to compare relative coordinates to absolute coordinates for one or more read points. A zone selector 1406 may receive the absolute coordinates and direct the reader manager 1412 to the appropriate zone controller. That is, a predefined area may be divided into a plurality of zones, where each zone has its own dedicated zone controller 1408. Therefore, the zone selector 1406 may determine in which zone the read point is located based on the absolute coordinates of the read point.

A zone controller 1408 may receive the reader positioning details from the reader manager 1412. For example, the zone controller 1408 may receive the absolute coordinates of the next read point. The zone controller 1408 interacts with a channel controller 1410 and a reader controller 1414. This allows for different channel and reader movement technologies to be deployed in different zones.

The channel controller 1410 controls the movement of a channel along a pair of guide tracks. For example, the channel controller 1410 may control the movement of the channel 104 or 1204 along the guide tracks 102a, 102b or 1202, respectively. The channel controller 1410 may receive the channel movement details, such as the target location for positioning the channel over the next read point, from the zone controller 1408. The channel controller 1410 may then move the channel to the target location. The channel controller 1410 includes a tracker 1411 and a mover 1412. The tracker 1411 provides constant feedback on the current location of the channel and the mover 1412 moves the channel based on this feedback and the target location.

The reader controller 1414 controls the movement of a reader along a channel. For example, the reader controller 1414 may control the movement of the reader 106 or 1206 along the channel 104 or 1204, respectively. The reader controller 1414 receives the reader movement details, such as the target location for the reader from the zone controller 1408 and moves the reader to the target location. The reader controller 1414 also includes a tracker 1415 and a mover 1416. The tracker 1415 provides constant feedback on the current location of the reader and the mover 1416 moves the reader based on this feedback and the target location.

Figure 15:
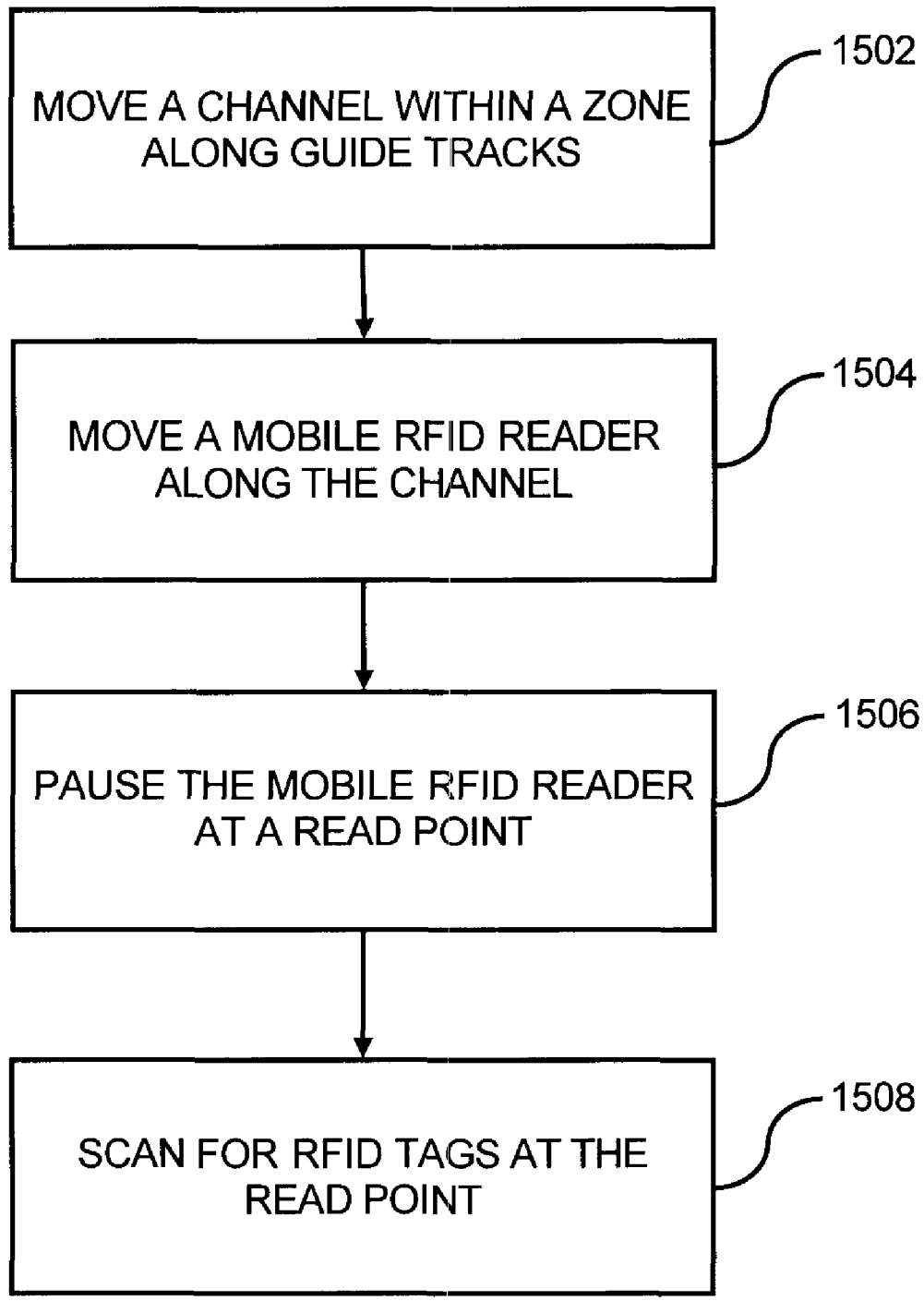
FIG. 15 shows a flow diagram of a method for moving a mobile RFID reader within a zone to scan for RFID tags, according to an embodiment of the invention.

Turning now to FIG. 15, there is shown a flow diagram of a method 1500 for scanning for RFID tags, according to an embodiment. It is to be understood that the following description of the method 1500 is but one manner of a variety of different manners in which an example of the invention may be practiced. It should also be apparent to those of ordinary skill in the art that the method 1500 represents a generalized illustration and that other steps may be added or existing steps may be removed, modified or rearranged without departing from a scope of the method 1500.

The description of the method 1500 is made with reference to the elements depicted in FIGS. 1-14, and thus makes reference to the elements cited therein. It should, however, be understood that the method 1500 is not limited to the elements set forth in FIGS. 1-14. Instead, it should be understood that the method 1500 may be practiced by a system having a different configuration than that set forth in FIGS. 1-14.

The method 1500 may be initiated at step 1502, where a channel within at least one zone is moved along guide tracks. The at least one zone may be a predefined area or any lesser portion thereof. For example, the at least one zone may be substantially similar to the zone 101, the first and second zones 902 and 904, or the zones A-D described above with respect to FIGS. 1, 9, and 12, respectively. The predefined area may be substantially similar to the predefined area 402. As such, the predefined area may be a room or a building, such as a warehouse. The guide tracks may be any mechanical devices configured to allow a channel to move thereon and, thus, may include wheels, rails, ball bearings, magnets, etc. In one embodiment, the guide tracks may be fixed to a ceiling of the predefined area. Therefore, in this embodiment, the zone may extend in three dimensions from the area between the guide tracks on the ceiling, down underneath the guide tracks to a floor of the predefined area. Similarly, in other embodiments, the zone may extend in three dimensions either above and/or below the guide tracks.

At step 1504, a mobile RFID reader is moved along a channel. Like the guide tracks, the channel may also include any mechanical device configured to move along the guide tracks and allow the reader to move along the channel. The mobile RFID reader may comprise any reasonably suitable device configured to read RFID tags. By moving the channel along the guide tracks and moving the mobile RFID reader along the channel, the mobile RFID reader may be moved to virtually any point within the at least one zone.

At step 1506, the mobile RFID reader is paused at a read point. Pausing may include slowing the speed of the mobile RFID reader or bringing the mobile RFID reader to a complete stop for a duration of time. The read point may be an optimized location for scanning for RFID tags and may be determined by the techniques described above. For example, a plurality of hexagonal areas may be combined together to create a combined area such that no gaps or overlaps exist between the plurality of hexagonal areas. The combined area may be equal to or larger than the predefined area. Each of the hexagonal areas may have substantially the same dimensions and the distance between the center of each of the hexagonal areas and a vertex of each of the hexagonal areas may substantially correspond to the reading range of the RFID reader. Therefore, the center of each of the hexagonal areas may substantially correspond to a read point.

At step 1508, the RFID reader may scan for RFID tags. Scanning for RFID tags may include transmitting an RF signal. The RF signal may activate passive RFID tags, which then transmit a responding signal. Alternatively, or in addition there, scanning may include simply "listening for" and reading RF signals transmitted by RFID tags powered from a source other than the RFID reader. In any event, information from RFID tags in the predefined area may be obtained, stored, and/or passed to another device.

Some or all of the operations set forth in the method 1500 may be contained as a utility, program, or subprogram, in any desired computer accessible medium. In addition, the method 1500 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

The system and methods described herein address the challenges in achieving substantially 100% coverage of a predefined area, such as a warehouse, using mobile RFID readers. Data may be collected efficiently by moving and pausing a reader at different optimized read points in order to limit redundant reads of the same RFID tags. Determining optimized read points allows RFID tags located anywhere in the predefined area to be read with the smallest possible set of read points. This makes the reading process very efficient and improves reader utilization significantly. The dynamic movement of the reader also provides flexibility of using readers with different read ranges and allows one reader to cover a large area. Moreover, the zoning of the predefined areas allows for different configurations to be used in different areas based on changing circumstances, such as tag-densities and storage conditions. The methods and systems described herein allow for continuous adaptive optimizations of a predefined area.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. An RFID system comprising:
a pair of guide tracks located on opposite boundaries of at least one zone, wherein the at least one zone is at least a portion of a predefined area;
a channel movably attached to the guide tracks, wherein the channel is configured to move along the guide tracks through the at least one zone; and
a mobile RFID reader movably attached to the channel, wherein the mobile RFID reader is configured to move along the channel and pause at a plurality of read points within the at least one zone to scan for RFID tags located within the predefined area, wherein the plurality of read points are determined by an arrangement of a plurality of hexagonal areas which are grouped together to create a combined area, wherein the combined area is aligned with the predefined area to define locations of the plurality of hexagonal areas, and wherein substantially central locations each hexagonal area represent the plurality of read points.

2. The RFID system of claim 1, wherein the predefined area is a warehouse, which is configured to store items associated with the RFID tags and the guide tracks are attached to a ceiling of the warehouse.

3. The RFID system of claim 1, wherein the plurality of read points are substantially optimized locations for reading RFID tags to obtain substantially complete coverage of the at least one zone while reducing an amount of redundant reads of the RFID tags.

4. The RFID system of claim 1, wherein the combined area is equal to or larger than the predefined area.

5. The RFID system of claim 4, wherein the hexagonal areas all have substantially the same dimensions and a distance from the center of each of the hexagonal areas to a vertex of each of the hexagonal areas substantially corresponds to a reading range of the RFID reader.

6. The RFID system of claim 1, further comprising:
a reader manager configured to facilitate the movement of the RFID reader between the plurality of read points, wherein the reader manager stores a map table containing both the relative and absolute coordinates of the plurality of read points.

7. The RFID system of claim 1, wherein at least one of the plurality of read points coincides with the position of at least one of the pair of guide tracks such that the mobile RFID reader is operable to read RFID tags located outside of the boundaries of the at least one zone.

8. The RFID system of claim 1, further comprising:
at least one of an area marker module configured to determine the position of the mobile RFID reader within the predefined area, a layout module configured to determine dimensions of the at least one zone, an obstacle position identifier configured to store data regarding obstacles in the predefined area, and a range and speed calibration module configured to monitor the movement of the mobile RFID reader.

9. The RFID system of claim 1, wherein the predefined area includes a second zone and, wherein the RFID system further comprises:
a second mobile RFID reader configured to move through the second zone and pause at a plurality of read points within the second zone to read RFID tags located within the second zone.

10. A method of scanning for RFID tags comprising:
arranging a plurality of hexagonal areas together to form a combined area, wherein each hexagonal area represents an area of coverage of a mobile RFID reader;
aligning the combined area with a predefined area to define locations of the plurality of hexagonal areas in the predefined area;
moving a channel along a pair of guide tracks, wherein the guide tracks are located on opposite boundaries of at least one zone, wherein the at least one zone is at least a portion of the predefined area;
moving the mobile RFID reader along the channel through at least a portion of the at least one zone;
pausing the mobile RFID reader at a read point within the at least one zone, wherein the read point comprises a substantially central location of a hexagonal area; and
scanning for RFID tags with the mobile RFID reader while the mobile RFID reader is paused at the read point.

11. The method of claim 10, wherein moving a channel along a pair of guide tracks comprises transmitting channel movement details from a zone controller to a channel controller, moving the mobile RFID reader along the channel comprises transmitting reader movement details from a zone controller to a reader controller, and scanning for RFID tags comprises reading information from RFID tags located within the predefined area.

12. The method of claim 10, further comprising:
 determining the position of the mobile RFID reader within the predefined area to monitor the movement of the mobile RFID read with respect to the predefined area.

13. The method of claim 10, wherein the hexagonal areas all have substantially the same dimensions and a distance from the center of each of the hexagonal areas to a vertex of each of the hexagonal areas substantially corresponds to a reading range of the RFID reader.

14. The method of claim 10, wherein the guide tracks are attached to the ceiling of a warehouse and scanning for RFID tags comprises scanning for RFID tags located underneath the ceiling of the warehouse.

15. The method of claim 10, wherein the at least one zone includes a plurality of read points and the method further comprises:
 moving the mobile RFID reader to another one of the plurality of read points;
 pausing the mobile RFID reader at the another one of the plurality of read points; and
 scanning for RFID tags at the another one of the plurality of read points.

16. The method of claim 10, wherein pausing the mobile RFID reader comprises stopping the mobile RFID reader at the read point for a duration of time while the mobile RFID reader scans for RFID tags.

17. The method of claim 10, further comprising:
 determining the relative and absolute coordinates of the read point; and
 storing the relative and absolute coordinates in a map table.

18. The method of claim 10, wherein the predefined area includes a second zone having a second mobile RFID reader and the method further comprises:
 moving the second mobile RFID reader through the second zone such that a reading range of the second mobile RFID reader is not within a reading range of the mobile RFID reader.

19. A non-transitory computer readable storage medium on which is embedded one or more computer programs, said one or more computer programs implementing a method for localizing a tag, said one or more computer programs comprising a set of instructions for:
 arranging a plurality of hexagonal areas together to form a combined area, wherein each hexagonal area represents an area of coverage of a mobile RFID reader;
 aligning the combined area with a predefined area to define locations of the plurality of hexagonal areas in the predefined area;
 moving a channel along guide tracks, wherein the guide tracks are located on opposite boundaries of at least one zone, wherein the at least one zone is at least a portion of the predefined area in the combined area;
 moving the mobile RFID reader along the channel through at least a portion of the at least one zone;
 pausing the mobile RFID reader at a read point within the at least one zone, wherein the read point comprises a substantially central location of a hexagonal area; and
 scanning for RFID tags with the mobile RFID reader while the mobile RFID reader is paused at the read point.

20. The non-transitory computer readable storage medium of claim 19, further comprising a set of instructions for:
 moving the mobile RFID reader to another one of the plurality of read points;
 pausing the mobile RFID reader at the another one of the plurality of read points; and
 scanning for RFID tags at the another one of the plurality of read points.

* * * * *

UNITED STATES PATENT AND TRADEMARK OFFICE
CERTIFICATE OF CORRECTION

PATENT NO.         : 8,063,738 B2
APPLICATION NO.    : 12/208344
DATED              : November 22, 2011
INVENTOR(S)        : Ravigopal Vennelakanti et al.

It is certified that error appears in the above-identified patent and that said Letters Patent is hereby corrected as shown below:

In column 20, line 3, in Claim 1, delete "locations each" and insert -- locations of each --, therefor.

In column 21, line 15, in Claim 12, delete "RFID read" and insert -- RFID reader --, therefor.

Signed and Sealed this
Second Day of October, 2012

David J. Kappos
*Director of the United States Patent and Trademark Office*